US010855857B2

(12) United States Patent
Ando

(10) Patent No.: US 10,855,857 B2
(45) Date of Patent: Dec. 1, 2020

(54) INFORMATION PROCESSING SYSTEM TO REGISTER A SERVICE TO A TARGET DEVICE

(71) Applicant: Mitsuo Ando, Fukuoka (JP)

(72) Inventor: Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/574,287

(22) Filed: Sep. 18, 2019

(65) Prior Publication Data
US 2020/0106900 A1 Apr. 2, 2020

(30) Foreign Application Priority Data

Sep. 27, 2018 (JP) ................. 2018-182886
Nov. 29, 2018 (JP) ................. 2018-223481

(51) Int. Cl.
H04N 1/00 (2006.01)
(52) U.S. Cl.
CPC ..... H04N 1/00474 (2013.01); H04N 1/00137 (2013.01); H04N 1/00148 (2013.01); H04N 1/00185 (2013.01)
(58) Field of Classification Search
None
See application file for complete search history.

(56) References Cited

U.S. PATENT DOCUMENTS

| | | | |
|---|---|---|---|
| 2004/0075857 | A1 | 4/2004 | Akiyoshi et al. |
| 2004/0218208 | A1 | 11/2004 | Akiyoshi et al. |
| 2004/0255263 | A1 | 12/2004 | Ando |
| 2006/0070087 | A1 | 3/2006 | Ando et al. |
| 2007/0047017 | A1 | 3/2007 | Ando et al. |
| 2007/0124510 | A1 | 5/2007 | Ando |

(Continued)

FOREIGN PATENT DOCUMENTS

| | | |
|---|---|---|
| JP | 2009-253890 A | 10/2009 |
| JP | 2014-149633 | 8/2014 |

OTHER PUBLICATIONS

Extended European Search Report dated Jan. 8, 2020 in European Patent Application No. 19196117.6, 11 pages.

Primary Examiner — Andrew H Lam
(74) Attorney, Agent, or Firm — Oblon, McClelland, Maier & Neustadt, L.L.P.

(57) ABSTRACT

An information processing system includes an intermediary apparatus communicable with a target apparatus, and an information processing apparatus, communicable with the intermediary apparatus, including circuitry. In response to reception of identification information from an operation terminal that has received the identification information from an external source, the circuitry provides information on a candidate service to be associated with the target apparatus to the operation terminal when the received identification information is not registered in association with any service. In response to reception of a selection result of a specific service from the operation terminal at the information processing apparatus, the circuitry registers the target apparatus that is identified based on information identifying the target apparatus to be associated with the specific service selected at the operation terminal, the specific service corresponding to the selection result, and the identification information in association with each other in a memory.

10 Claims, 25 Drawing Sheets

(56) References Cited

U.S. PATENT DOCUMENTS

| | | |
|---|---|---|
| 2008/0005029 A1 | 1/2008 | Ando |
| 2008/0066084 A1 | 3/2008 | Akiyoshi et al. |
| 2008/0098389 A1 | 4/2008 | Akiyoshi et al. |
| 2009/0019440 A1 | 1/2009 | Ando |
| 2009/0276826 A1 | 11/2009 | Ando |
| 2010/0309502 A1 | 12/2010 | Ando et al. |
| 2013/0073719 A1 | 3/2013 | Ando |
| 2013/0114095 A1 | 5/2013 | Akiyoshi et al. |
| 2013/0185605 A1 | 7/2013 | Ando et al. |
| 2013/0242331 A1 | 9/2013 | Ando |
| 2013/0258407 A1 | 10/2013 | Akiyoshi et al. |
| 2013/0308161 A1 | 11/2013 | Ando et al. |
| 2014/0016165 A1 | 1/2014 | Ando |
| 2015/0186188 A1 | 7/2015 | Ando |
| 2015/0264200 A1 | 9/2015 | Ando |
| 2015/0281332 A1 | 10/2015 | Naito et al. |
| 2016/0119506 A1 | 4/2016 | Namihira et al. |
| 2016/0342577 A1 | 11/2016 | Ando |
| 2017/0102865 A1 | 4/2017 | Ando |
| 2017/0257683 A1* | 9/2017 | Yamada ................ H05B 45/00 |
| 2017/0272601 A1 | 9/2017 | Ando |
| 2017/0339232 A1 | 11/2017 | Ando |
| 2018/0084121 A1 | 3/2018 | Ando |
| 2018/0176417 A1 | 6/2018 | Ando |
| 2019/0014004 A1* | 1/2019 | Horiuchi ................ G06F 13/00 |

* cited by examiner

FIG. 8

| TENANT ID | COMMUNICATION ID | ADDRESS INFORMATION | STATE INFORMATION | BROWSER ID | BROWSER STATE |
|---|---|---|---|---|---|
| T001 | Eg001-01 | 10.56.60.xx | BEING CONNECTED | BROWSER1 | POWER OFF |
| | Eg001-02 | 192.168.0.xx | NOT CONNECTED | BROWSER2 | POWER OFF |
| | .. | .. | .. | .. | .. |
| .. | .. | .. | .. | .. | .. |

| REGISTRATION ID | IN-APPLICATION ID | OUT-APPLICATION ID | BROWSER ID |
|---|---|---|---|
| Tag01 | AP_Upload | AP_PhotoShow | BROWSER1 |
| : | : | : | : |

| APPLICATION ID | APPLICATION TYPE | URL |
|---|---|---|
| AP_PhotoShow | Out | https://daas.com/photoshow |
| AP_Upload | In | https://daas.com/upload |

~121

| TENANT ID | USER ID | ··· ~123 |
|---|---|---|
| T001 | gest | ··· |
| | taro | ··· |
| | ··· | ··· |
| : | : | : |

FIG. 19

| TENANT ID | USER ID | MESSAGE USER ID | ~123 |
|---|---|---|---|
| T001 | gest | ... | ... |
| | taro | ... | ... |
| | ... | ... | ... |
| ... | ... | | ... |

FIG. 24

| TENANT ID | COMMUNICATION ID | ADDRESS INFORMATION | STATE INFORMATION | BROWSER ID | BROWSER STATE | PASSCODE |
|---|---|---|---|---|---|---|
| T001 | Eg001-01 | 10.56.60.xx | BEING CONNECTED | BROWSER1 | POWER ON | 1965 |
|  | Eg001-02 | 192.168.0.xx | NOT CONNECTED | BROWSER2 | POWER OFF |  |
|  | .. | .. | .. | .. | .. | .. |
| .. | .. | .. | .. | .. | .. | .. |

122

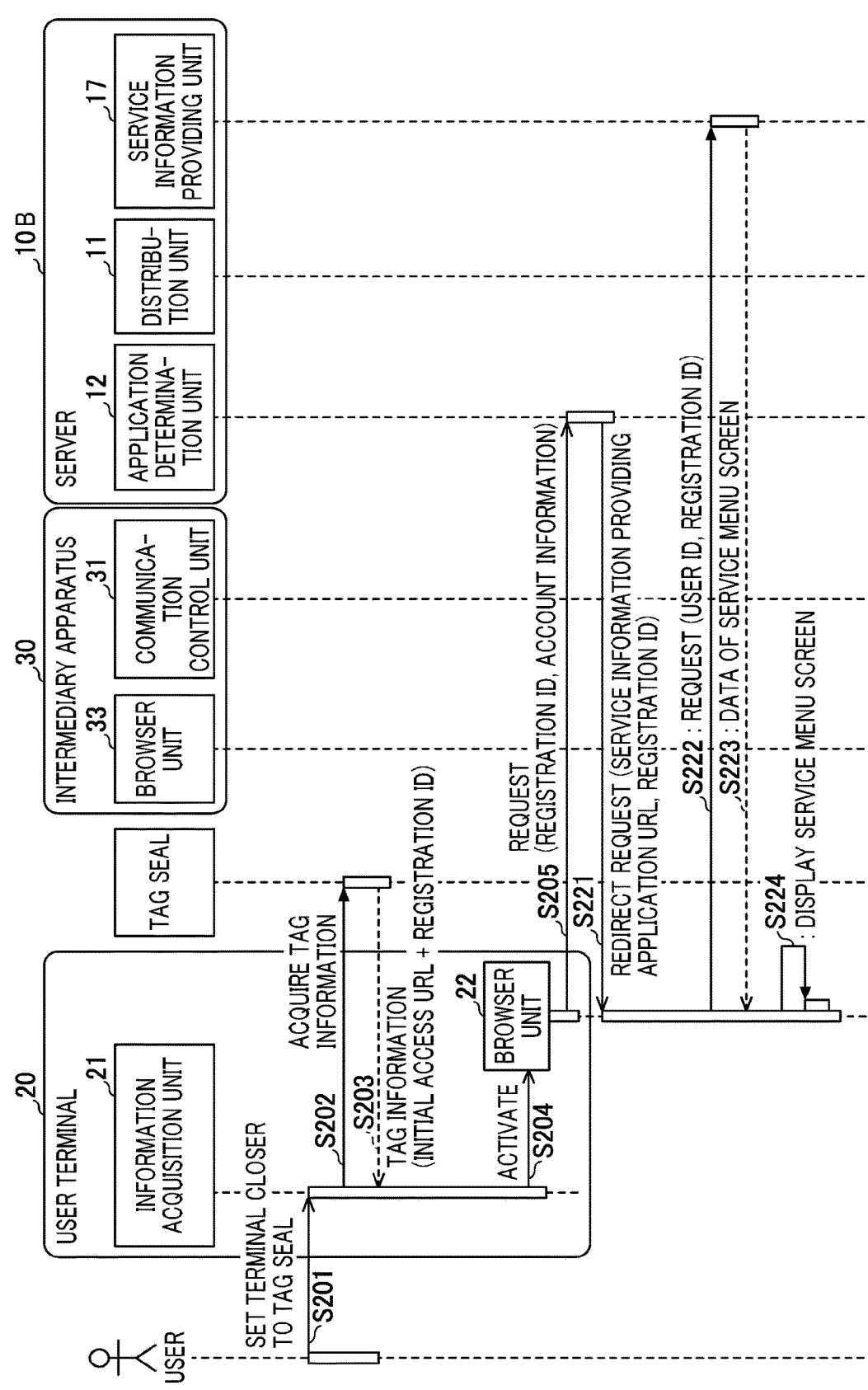

| SERVICE ID | IN-APPLICATION ID | OUT-APPLICATION ID |
|---|---|---|
| Cam2Slide | AP_Upload | AP_PhotoShow |
| Cam2Split | | AP_4Split |
| Cloud2Slide | AP_InCloud | AP_Show |
| Cloud2Split | | AP_4Split |

125

INFORMATION PROCESSING SYSTEM TO REGISTER A SERVICE TO A TARGET DEVICE

CROSS-REFERENCE TO RELATED APPLICATION

This application claims priority pursuant to 35 U.S.C. § 119(a) to Japanese Patent Application Nos. 2018-182886, filed on Sep. 27, 2018 and 2018-223481 filed on Nov. 29, 2018 in the Japan Patent Office, the disclosure of which are incorporated by reference herein in their entirety.

BACKGROUND

Technical Field

This disclosure relates to an information processing system, a method of processing information, and an information processing apparatus.

Background Art

One conventional technology discloses a technique, in which a user terminal acquires an apparatus identification (ID) and a service ID from a signage device, and when the apparatus ID and the service ID are transmitted to a server from the user terminal, the server identifies a workflow based on a combination of the apparatus ID and the service ID received by the server, and then the identified workflow is performed. Further, the server is configured to perform a workflow such as transmitting synthesized images to the signage device.

SUMMARY

As one aspect of the present invention, an information processing system is devised. The information processing system includes an intermediary apparatus communicable with a target apparatus, and an information processing apparatus including circuitry and a memory. The information processing apparatus is communicable with the intermediary apparatus. In response to reception of identification information from an operation terminal that has received the identification information from an external source, the circuitry provides information on a candidate service to be associated with the target apparatus to the operation terminal when the received identification information is not registered in association with any service in the information processing apparatus. In response to reception of a selection result of a specific service from the operation terminal at the information processing apparatus, the circuitry registers the target apparatus that is identified based on information identifying the target apparatus to be associated with the specific service selected at the operation terminal, the specific service corresponding to the selection result, and the identification information in association with each other in the memory.

As another aspect of the present invention, a method of processing information in an information processing system including an intermediary apparatus communicable with a target apparatus, and an information processing apparatus communicable with the intermediary apparatus is devised. The method includes, in response to reception of identification information from an operation terminal that has received the identification information from an external source, providing information on a candidate service to be associated with the target apparatus to the operation terminal when the received identification information is not registered in association with any service in the information processing apparatus, and in response to reception of a selection result of a specific service from the operation terminal at the information processing apparatus, registering the target apparatus that is identified based on information identifying the target apparatus to be associated with the specific service selected at the operation terminal, the specific service corresponding to the selection result, and the identification information in association with each other.

As another aspect of the present invention, an information processing apparatus communicable with a target apparatus and an intermediary apparatus is devised. The information processing apparatus includes circuitry and a memory. In response to reception of identification information from an operation terminal that has received the identification information from an external source, the circuitry provides information on a candidate service to be associated with the target apparatus to the operation terminal when the received identification information is not registered in association with any service in the information processing apparatus. In response to reception of a selection result of a specific service from the operation terminal at the information processing apparatus, the circuitry registers the target apparatus that is identified based on information identifying the target apparatus to be associated with the specific service selected at the operation terminal, the specific service corresponding to the selection result, and the identification information in association with each other in the memory.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 8 is an example of information stored in an apparatus information storage unit;

FIG. 9 is an example of information stored in a registration information storage unit;

FIG. 10 is an example of information stored in an application information storage unit;

FIG. 19 is an example of information stored in a user information storage unit according to the second embodiment;

FIG. 24 is an example of information stored in an apparatus information storage unit according to the third embodiment;

FIGS. 26A and 26B (FIG. 26) are an example sequence diagram of processing, which is performed when a user terminal is placed closer to an unregistered tag seal;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

First Embodiment

Figure 1:
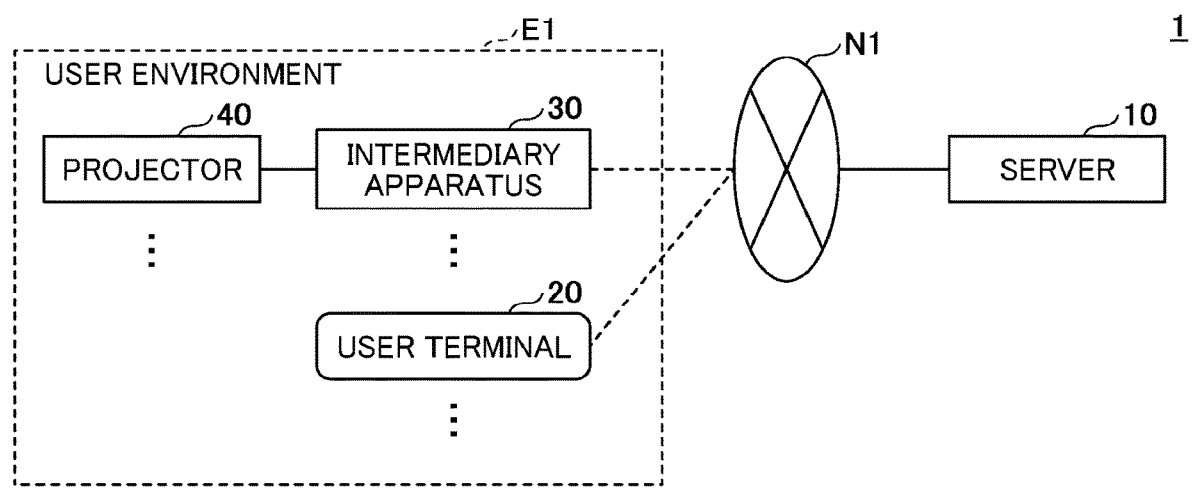
FIG. 1 is an example system configuration of an information processing system according to a first embodiment.

Hereinafter, a description is given of an information processing system 1 of a first embodiment with reference to FIG. 1. FIG. 1 is an example system configuration of the information processing system 1 according to the first embodiment. The information processing system 1 includes, for example, a server 10, and a user environment E1 including one or more apparatuses, such as one or more user terminals 20, one or more intermediary apparatuses 30, and one or more projectors 40. In the information processing system 1 of FIG. 1, the server 10 and the user environment E1 can communicate with each other via a network N1, such as a wide area network using the Internet. The network N1 can be any network that can be accessed within a pre-set range, such as an Intranet.

The user environment E1 indicates a system environment of an entity, such as a company, having one or more output apparatuses, such as one or more projectors 40, and one or more intermediary apparatuses 30. The projector 40 is an apparatus for projecting an input image onto a projection plane, and the projector 40 is described as an example of an output apparatus in this specification. In the user environment E1, each of the projectors 40 is connected to each of the intermediary apparatuses 30 corresponding to each of the projectors 40. That is, the projectors 40 and the intermediary apparatuses 30 are linked with each other one-to-one. The projector 40 and the intermediary apparatus 30 can be connected via an interface compatible to a standard interface of image transmission, such as high definition multimedia interface (HDMI: registered trademark). For example, the projector 40 and the intermediary apparatus 30 can be connected using a cable, such as HDMI (registered trademark) cable, corresponding to the standard interface of image transmission. Alternatively, a connector of the intermediary apparatus 30 compatible to the standard interface and a connector of the projector 40 compatible to the standard interface can be connected directly. For example, when the connector of the intermediary apparatus 30 is inserted into the connector of the projector 40, the intermediary apparatus 30 and the projector 40 can be connected. Alternatively, the intermediary apparatus 30 and the projector 40 can be connected using wireless communication, or connected via a network.

By connecting the projector 40 and the intermediary apparatus 30 as described above, the intermediary apparatus 30 can transmit to-be-projected images to the projector 40. Hereinafter, the projector 40 may mean one or more projectors and the intermediary apparatus 30 may mean one or more intermediary apparatuses.

The intermediary apparatus 30 is connected to the network N1 via a local area network (LAN) set in the user environment E1. The intermediary apparatus 30 can be wirelessly connected to the network, such as LAN, set in the user environment E1. The intermediary apparatus 30, installed with a web browser, executes the web browser to perform various processing in response to receiving an execution request of processing for image data, transmitted from the server 10, and controls the output apparatus, such as the projector 40, in which the processing result is output using the projector 40. Specifically, in the embodiment, the intermediary apparatus 30 causes the projector 40 to perform outputting the image data, such as projection of the image data. That is, the intermediary apparatus 30 mediates the output (e.g., projection) of image data using the projector 40 for the image data transmitted from the server 10. For example, a computer, such as an HDMI (registered trademark) dongle, a stick PC or the like can be used as the intermediary apparatus 30. In this description, the intermediary apparatus 30 may be referred to as the intermediary apparatus 30A in a second embodiment, to be described later.

The user terminal 20 is an information processing terminal to be carried by each user in the user environment E1. For example, a smartphone, a tablet device, a PC, or a cellular phone can be used as the user terminal 20. The user terminal 20 can be connected to the network N1 without using the LAN provided in the user environment E1 (e.g., via a mobile communication network). However, the user terminal 20 can be also connected to the network provided in the user environment E1. In this description, the user terminal 20 may be referred to as the user terminal 20A in the second embodiment, to be described later.

The server 10 is one or more computers that execute processing for implementing the outputting of image data designated at the user terminal 20, using the output apparatus, such as the projector 40 based on a simple operation using the user terminal 20. Further, the server 10 can be disposed in the user environment E1. The server 10 is described as an example of the information processing apparatus. In this description, the server 10 may be referred to as the server 10A and 10B in a second embodiment and a third embodiment, respectively, to be described later.

Figure 2:
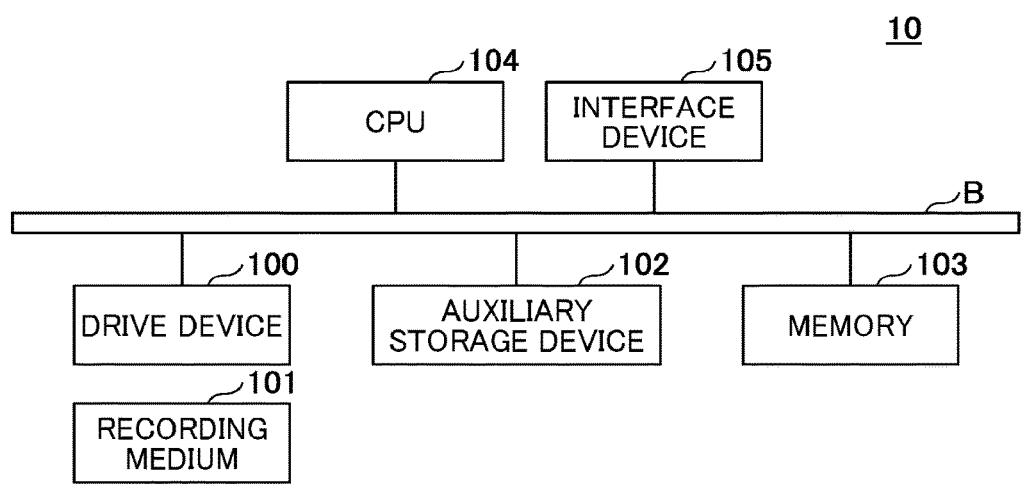
FIG. 2 is an example block diagram of a hardware configuration of a server according to the first embodiment.

FIG. 2 is an example block diagram of a hardware configuration of the server 10 according to the first embodiment. As indicated in FIG. 2, the server 10 includes, for example, a drive device 100, an auxiliary storage device 102, a memory 103, a central processing unit (CPU) 104, and an interface device 105, which are connected to each other via a bus B.

One or more programs for implementing various processing in the server 10 can be provided from a recording medium 101 such as a compact disc read-only memory (CD-ROM). Hereinafter, the program may mean one or more programs. When the recording medium 101 storing the program is set to the drive device 100, the program is installed in the auxiliary storage device 102 via the drive device 100 from the recording medium 101. However, the program installation is not necessarily need to be carried out via the recording medium 101, but the program can be downloaded from another computer via a network. The auxiliary storage device 102 stores the installed program and necessary files and data.

The memory 103 reads and stores the program from the auxiliary storage device 102 when the program is instructed to be activated. The CPU 104 executes the program stored in the memory 103 to implement functions of the server 10. The interface device 105 is used as an interface for connecting to the network.

Figure 3:
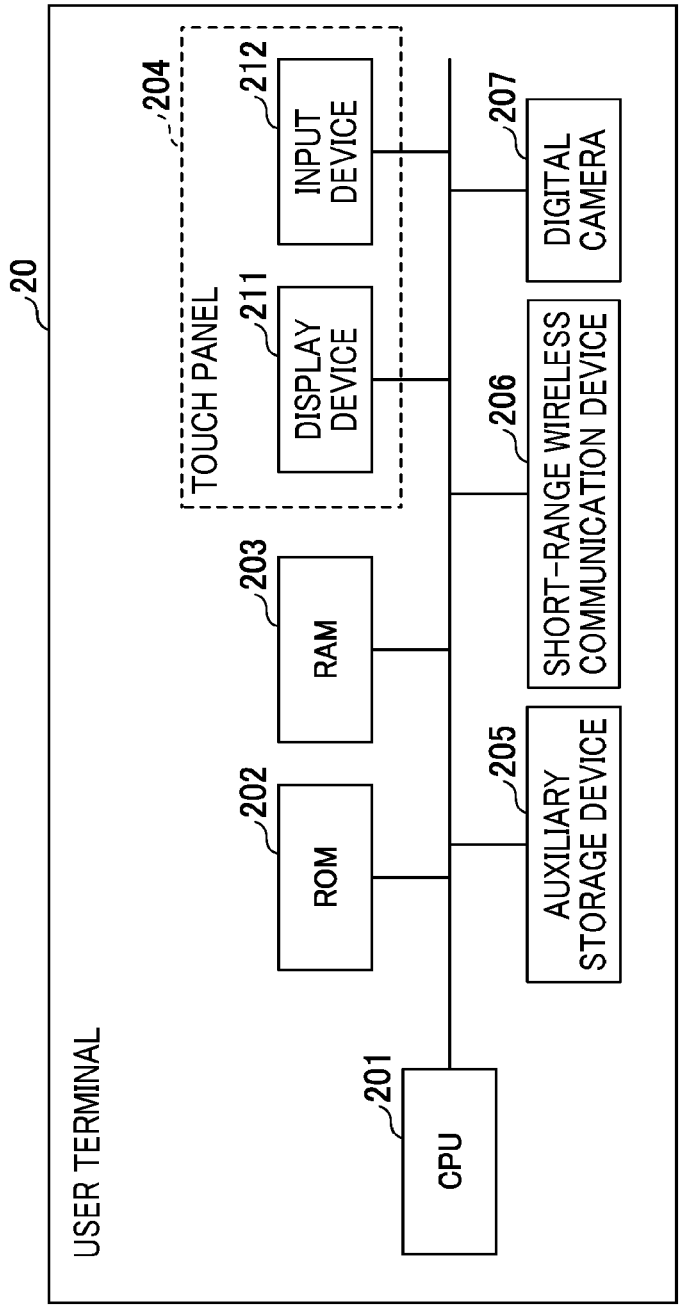
FIG. 3 is an example block diagram of a hardware configuration of a user terminal according to the first embodiment.

FIG. 3 is an example block diagram of a hardware configuration of the user terminal 20 according to the first embodiment. As indicated in FIG. 3, the user terminal 20 includes, for example, a CPU 201, a ROM 202, a RAM 203, a touch panel 204, an auxiliary storage device 205, a short-range wireless communication device 206, and a digital camera 207.

The ROM 202 and the auxiliary storage device 205 store the program installed on the user terminal 20. When the program is instructed to be activated, the RAM 203 reads and stores the program from the ROM 202 or the auxiliary storage device 205. The CPU 201 executes the program stored in the RAM 203 to implement functions of the user terminal 20.

The touch panel 204 is an electronic component equipped with both an input function and a display function, and performs information display, and a reception of input from a user. As indicated in FIG. 3, the touch panel 204 includes, for example, a display device 211, and an input device 212.

The display device 211 is, for example, a liquid crystal display, and performs a display function of the touch panel 204. The input device 212 is an electronic component including a sensor that can detect a contact of an object contacting the display device 211. The object means an object that contacts a contact surface (face) of the touch panel 204. Examples of the object include a user finger, a special pen, or a general pen. The touch panel 204 is not necessarily need to be provided. The user terminal 20 may be provided with the display device 211 and the input device 212 separately. Further, the display device 211 can be connected to the user terminal 20 externally. Further, the input device 212 is not limited to the sensor for detecting the contact. For example, the input device 212 includes electronic components, such as hardware keys, a keyboard, a mouse, and the like.

The short-range wireless communication device 206 is a hardware resource used for performing short-range wireless communication. In the first embodiment, the short-range wireless communication device 206 reads information stored in a near field communication (NFC) tag. That is, in the first embodiment, an NFC reader is suitable for the short-range wireless communication device 206. The digital camera 207 can be a general digital camera having an imaging function. The digital camera 207 can be embedded as an electronic component inside the user terminal 20, or the digital camera 207 can be connected to the user terminal 20 externally.

Figure 4:
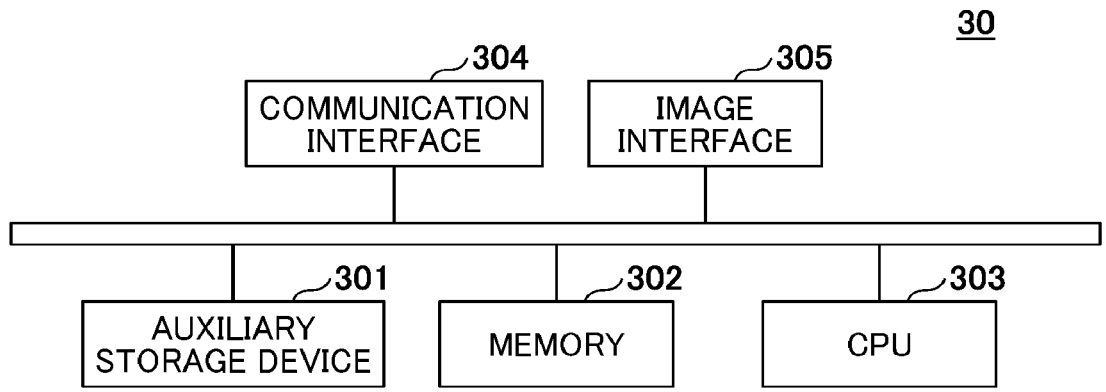
FIG. 4 is an example block diagram of a hardware configuration of an intermediary apparatus according to the first embodiment.

FIG. 4 is an example block diagram of a hardware configuration of the intermediary apparatus 30 according to the first embodiment. As indicated in FIG. 4, the intermediary apparatus 30 includes, for example, an auxiliary storage device 301, a memory 302, a CPU 303, a communication interface 304, and an image interface 305.

One or more programs for implementing various processing in in the intermediary apparatus 30 is installed in the auxiliary storage device 301. Hereinafter, the program may mean one or more programs. The auxiliary storage device 301 stores the installed program, and necessary files and data.

The memory 302 reads and stores the program from the auxiliary storage device 301 when the program is instructed to activate. The CPU 303 executes the program stored in the memory 302 to implement functions of the intermediary apparatus 30. The communication interface 304 is a physical interface for connecting to the network. The image interface 305 is a physical interface for transmitting image data to the projector 40.

Figure 5:
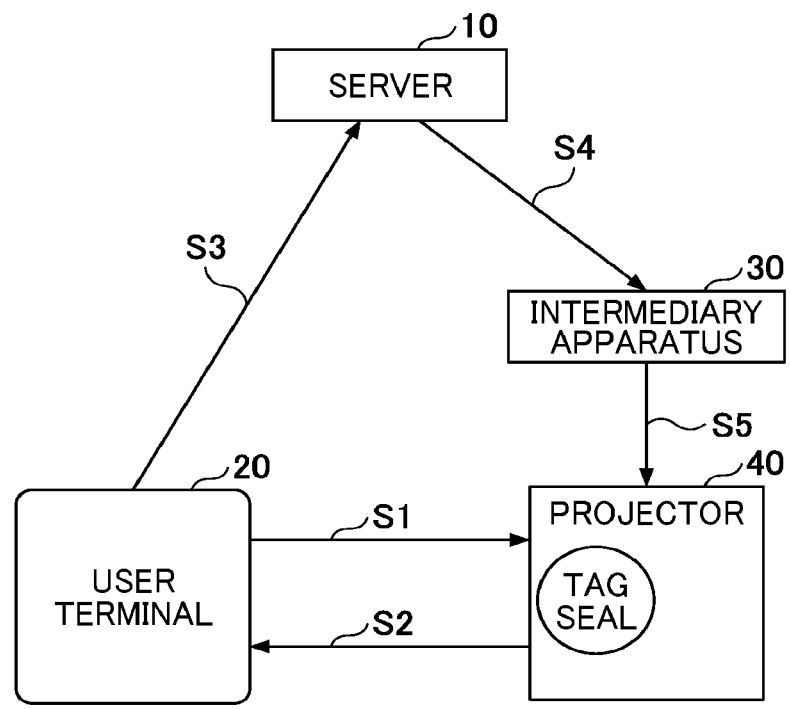
FIG. 5 is an example diagram of a scheme of the information processing system according to the first embodiment.

FIG. 5 is an example diagram of a scheme of the information processing system of the first embodiment. As indicated in FIG. 5, the projector 40 is attached with, for example, a seal type NFC tag. Hereinafter, the seal type NFC tag is referred to as the "tag seal." The tag seal stores information (hereinafter, "tag information") including a universal resource locator (URL) to be accessed by the user terminal 20 initially (hereinafter, "initial access URL") among one or more URLs for accessing the server 10. The tag information includes the initial access URL assigned with optional information, such as a registration identification (ID). For example, the tag information employs a following format.

https://xxx.yyy.com/?tagid=Tag01

In this format, "XXX" portion of "tagid=XXX" (i.e., "Tag01" in this example) corresponds to the registration ID. The registration ID represents identification information stored or registered in the server 10. Each one of the tag seals can be assigned with unique registration ID (each tag seal assigned with different registration ID), or the same registration ID can be assigned to a plurality of tag seals. On the other hand, the portion of "https://xxx.yyy.com/" (i.e., initial access URL) can be common to the tag information stored in each of the tag seals used in the user environment E1. Further, a configuration that the registration ID is not included in the initial access URL can be employed, and a configuration that the registration ID is stored separately from the initial access URL can be employed.

When a user places the user terminal 20 near the tag seal attached to the projector 40 (step S1), the short-range wireless communication device 206 of the user terminal 20 reads out and acquires the tag information stored in the tag seal (step S2).

Then, the user terminal 20 accesses the server 10, which is a destination of the initial access URL (e.g., "https://xxx.yyy.com") included in the acquired tag information (step S3). At this stage, the registration ID included in the acquired tag information is also transmitted to the server 10 from the user terminal 20.

The server 10 controls the execution of one or more services pre-registered in association with the registration ID. For example, if the concerned service is a projection of image data captured by the user terminal 20 using the projector 40, the server 10 acquires, from the user terminal 20, the image data captured by the user terminal 20, and then transmits the image data to the intermediary apparatus 30 associated with the registration ID (step S4). The server 10 further transmits, for example, display data of a screen prompting uploading of the image data to the user terminal 20, and then the user terminal 20 displays the screen on a display. When a user performs an operation on the screen displayed on the user terminal 20, the server 10 receives and acquires the image data captured by the user terminal 20, from the user terminal 20.

When the intermediary apparatus 30 receives the image data from the server 10 (step S4), the intermediary apparatus 30 renders or generates an image based on the image data. Then, the intermediary apparatus 30 transmits the rendering result to the projector 40 (step S5). Then, the projector 40 projects the rendering result (i.e., image of image data) on to a screen, such as a wall.

Therefore, the user can use the concerned service related to the above described output apparatus (e.g., projector 40) by performing a simple operation, such as obtaining or acquiring the tag information from an external source disposed outside the user terminal 20. For example, in the above described example case, the service can be used by performing the simple operation such as placing or bringing the user terminal 20 to a position closer to the tag seal attached or pasted on the projector 40. As described above, the service to be performed in accordance with the registration ID can be identified. That is, different services can be associated with different registration ID.

Figure 6:
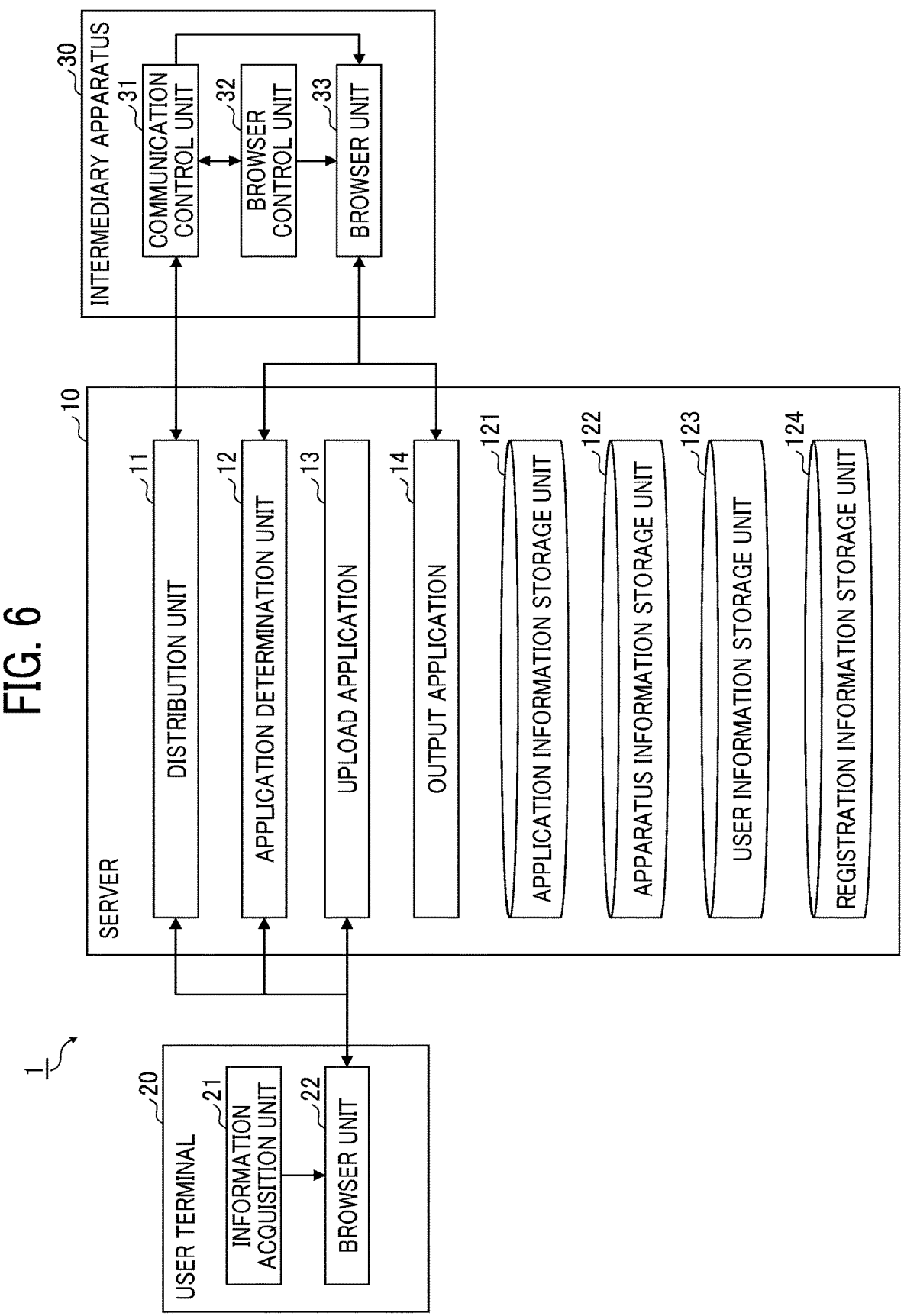
FIG. 6 is an example block diagram of a functional configuration of each apparatus in the information processing system according to the first embodiment.

In order to implement the processing described in FIG. 5, the user terminal 20, the intermediary apparatus 30 and the server 10 employ the functional configuration indicated in FIG. 6.

FIG. 6 is an example block diagram of a functional configuration of each apparatus in the information processing system 1 according to the first embodiment. As indicated in FIG. 6, the user terminal 20 includes, for example, an information acquisition unit 21 and a browser unit 22. These units can be implemented by executing one or more programs installed in the user terminal 20 using the CPU 201.

The information acquisition unit 21 acquires the tag information (e.g., the initial access URL including the registration ID) from the tag seal using the short-range wireless communication device 206, and activates the browser unit 22 using the tag information as input information. The information acquisition unit 21 can be implemented by executing a part of an operating system (OS) of the user terminal 20 by the CPU 201.

The browser unit 22 is, for example, a general web browser, and performs processing according to hypertext markup language (HTML) data and script (e.g., JavaScript (registered trademark)) or the like. The browser unit 22 transmits the registration ID included in the tag information to the application determination unit 12 of the server 10 corresponding to the initial access URL included in the tag information, which is notified as the input information from the information acquisition unit 21. Further, when the application determination unit 12 transmits a response such as a redirect request in response to the accessing to the initial access URL, the browser unit 22 accesses a specific application associated with the registration ID in accordance with the redirect request received from the application determination unit 12, among applications installed on the server 10. Then, the browser unit 22 acquires data (e.g., HTML data, script) indicating an execution request of processing to the user terminal 20 from the application.

As indicated in FIG. 6, the intermediary apparatus 30 includes, for example, a communication control unit 31, a browser control unit 32, and a browser unit 33. These units can be implemented by executing one or more programs installed in the intermediary apparatus 30 using the CPU 303.

The communication control unit 31 connects a bi-directional communication path with the distribution unit 11 of the server 10 (i.e., establishing a communication session), and functions as an endpoint at the intermediary apparatus 30 on the communication path (communication session). By performing the communication via the communication path (communication session), the state of the intermediary apparatus 30 can be notified to the server 10, and the intermediary apparatus 30 can receive, from the server 10, a notification that image data to be projected using the projector 40 is input to the server 10. In the first embodiment, the intermediary apparatus 30 can receive, from the server 10, a notification that the image data is uploaded to the server 10 from the user terminal 20.

The browser control unit 32 activates the browser unit 33 using, for example, a kiosk mode. The kiosk mode is a mode that restricts the usage of the intermediary apparatus 30 to displaying of web pages alone. The kiosk mode is just one example. Any mode that can display the web pages can be employed.

The browser unit 33 is, for example, a general web browser, and performs processing according to HTML data and script. The browser unit 33 accesses the initial access URL (i.e., the application determination unit 12 of the server 10) in response to the activation. At this stage, the identification information of the browser unit 33 (hereinafter, "browser ID") is assigned to the initial access URL as optional information. Further, when the application determination unit 12 transmits a response such as a redirect request in response to the accessing to the initial access URL, the browser unit 33 accesses a specific application associated with the browser ID, in accordance with the redirect request received from the application determination unit 12, among applications installed on the server 10. Then, the browser unit 33 acquires data (e.g., HTML data, script) indicating an execution request of processing to the intermediary apparatus 30 from the specific application.

The rendering content (rendering result), which is generated by the browser unit 33 from the acquired data is output to the projector 40 via an interface compatible to the HDMI (registered trademark). That is, the browser unit 33 and the projector 40 correspond one to one. Therefore, as to the intermediary apparatus 30, the browser ID represents the identification information of the browser unit 33 and also represents the identification information of the projector 40 corresponding to the browser unit 33.

As indicated in FIG. 6, the server 10 includes, for example, a distribution unit 11, an application determination unit 12, an upload application 13, and an output application 14. These units can be implemented by executing one or more programs installed on the server 10 using the CPU 104. The server 10 further includes an application information storage unit 121, an apparatus information storage unit 122, a user information storage unit 123, and a registration information storage unit 124. Each of these storage units can be implemented by, for example, the auxiliary storage device 102, or a storage device that can be connected to the server 10 via a network.

The distribution unit 11 receives image data, which becomes input data for a service associated with the registration ID, from an input source of the image data, and notifies the input of image data to an output destination of the image data, which performs the service. In response to a request received from the output destination, the distribution unit 11 transmits the image data to the output destination. In the embodiment, the input source is the user terminal 20, and the output destination is the intermediary apparatus 30.

The application determination unit 12 determines the application corresponding to the initial access URL. In response to accessing to the initial access URL, the application determination unit 12 refers to the registration information storage unit 124 to determine an application corresponding to the optional information (e.g., registration ID or browser ID) assigned to the initial access URL. Then, the application determination unit 12 transmits a response including a redirect request including a URL of the determined application to an accessing source that has accessed the initial access URL of the server 10, such as the user terminal 20.

In the embodiment, the application determination unit 12 determines a URL of the upload application 13 as the application corresponding to the registration ID for the access from the user terminal 20 used as the input source of the image data. Further, the application determination unit 12 determines a URL of the output application 14 as an application corresponding to the browser ID for the access from the intermediary apparatus 30 used as the output destination of the image data.

The upload application 13 and the output application 14 are examples of applications installed on the server 10 in the embodiment. The upload application 13 is an application for causing the user terminal 20 to upload the image data. Specifically, the upload application 13 transmits HTML data and script to the user terminal 20 to cause the user terminal 20 upload the image data.

The output application 14 is an application for causing the intermediary apparatus 30 to execute an acquisition (downloading) and outputting of the image data uploaded from the user terminal 20. Specifically, the output application 14 transmits HTML data and script to the intermediary apparatus 30 to cause the intermediary apparatus 30 acquire and output the image data.

The application information storage unit 121 stores information (e.g., URL) related to each of applications installed on the server 10. In the embodiment, the application information storage unit 121 stores, for example, information related to the upload application 13 and the output application 14.

The user information storage unit 123 stores identification information of one or more users who are allowed to use the applications installed on the server 10.

The apparatus information storage unit 122 stores information indicating the state of the intermediary apparatus 30 for each of the intermediary apparatuses 30 disposed in the user environment E1.

The registration information storage unit 124 stores identification information of an application to execute the input processing of image data, identification information of an application to execute the output processing of image data, and identification information of the browser unit 33 of the intermediary apparatus 30 used as the output destination of the image data (i.e., identification information of the projector 40) for each of the registration IDs.

Figure 7:
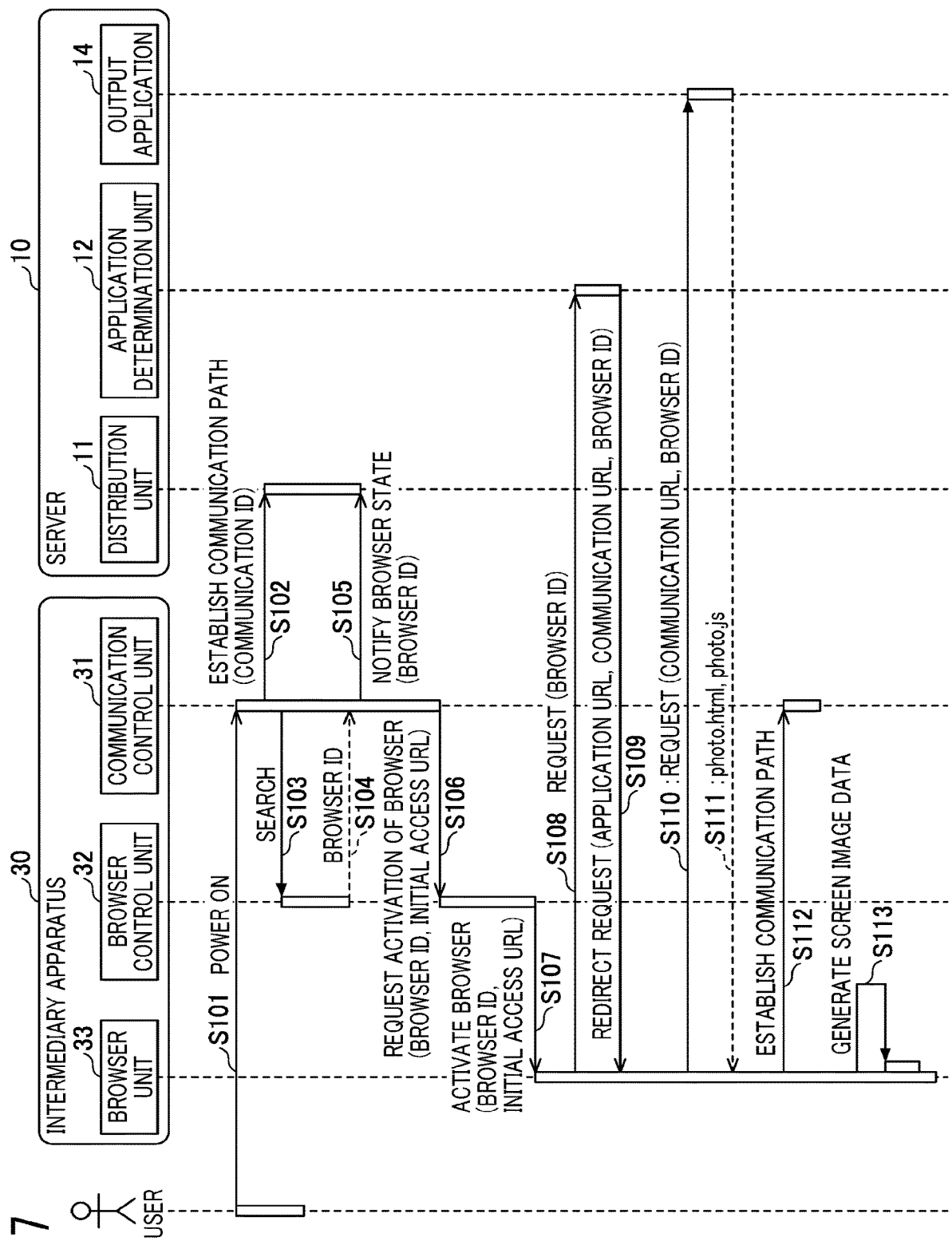
FIG. 7 is an example sequence diagram of processing, which is performed in response to an activation of an intermediary apparatus.

Hereinafter, a description is given of processing performable in the information processing system 1 with reference to FIG. 7. FIG. 7 is an example sequence diagram of processing, which is performed in response to an activation of the intermediary apparatus 30.

When a user turns on the power supply to the intermediary apparatus 30 (step S101), the communication control unit 31 establishes a communication path with the distribution unit 11 of the server 10 to receive a request from the distribution unit 11 of the server 10 asynchronously (step S102). At this stage, the communication control unit 31 notifies a communication ID, which is the identification information of the communication control unit 31, to the distribution unit 11. Then, the distribution unit 11 updates the apparatus information storage unit 122 based on the communication ID (hereinafter, "target communication ID") notified from the communication control unit 31.

FIG. 8 is an example of information stored in the apparatus information storage unit 122. As indicated in FIG. 8, the apparatus information storage unit 122 stores, for example, tenant ID, communication ID, address information, state information, browser ID, and browser state in association with each other.

The tenant ID represents identification information of a subscriber (e.g., tenant) having a service-use contract provided by the server 10. For example, the user environment E1 can be one tenant.

The communication ID represents identification information of the communication control unit 31 of each intermediary apparatus 30 disposed in the tenant identified or specified by the tenant ID. If the intermediary apparatus 30 includes only one communication control unit 31, the communication ID can be used as the identification information identifying the intermediary apparatus 30.

The address information represents a local internet protocol (IP) address of the intermediary apparatus 30.

The state information represents information indicating whether or not the communication control unit 31, identified or specified by the communication ID, is being connected to the server 10, such as whether the communication control unit 31 has established the communication path with the server 10 ("being connected") or not ("not connected").

The browser ID represents identification information of the browser unit 33 corresponding to the communication control unit 31 identified or specified by the communication ID. In the embodiment, the browser ID represents identification information of the browser unit 33 included in the same intermediary apparatus 30 including the communication control unit 31 identified or specified by the communication ID, and also the identification information of the projector 40 used as the output destination of the rendering content of the browser unit 33.

The browser state represents information indicating the activation state of the browser unit 33 identified or specified by the browser ID.

For example, if the target communication ID notified to the distribution unit 11 is "Eg001-01," the state information corresponding to the target communication ID in the apparatus information storage unit 122 is changed to "being connected" as indicated in FIG. 8.

Then, the communication control unit 31 searches the browser control unit 32 to obtain or acquire the browser ID using, for example, simple network management protocol (SNMP) (step S103).

Then, the communication control unit 31 obtains or acquires the browser ID, which is the identification information of the browser unit 33 that is a control target of the browser control unit 32, from the searched browser control unit 32 (step S104).

In the embodiment, the intermediary apparatus 30 includes the communication control unit 31 and the browser control unit 32. In this configuration, the communication control unit 31 included in one intermediary apparatus 30 searches the browser control unit 32 using the simple network management protocol (SNMP), in which the communication control unit 31 included in one intermediary apparatus 30 can communicate with the browser control unit 32 included in another intermediary apparatus 30, with which a plurality of the browser control units 32 and the browser units 33 can be used. Therefore, the searching of the browser control unit 32 is not necessarily required, but the acquiring destination (browser control unit 32) that the communication control unit 31 is to acquire the browser ID can be pre-set in advance.

Then, the communication control unit 31 transmits, to the distribution unit 11, a notification that the state of the browser unit 33 corresponding to the acquired browser ID (e.g., the browser unit 33 of the intermediary apparatus 30) becomes ready for use by designating the browser ID (hereinafter, "target browser ID") of the browser unit 33 (step S105). In response to receiving the notification from the communication control unit 31, the distribution unit 11 updates the apparatus information storage unit 122 (FIG. 8) based on the target browser ID designated in the notification. Specifically, a value of the browser state corresponding to the target browser ID is updated from "power OFF" to "power ON" in the apparatus information storage unit 122.

Then, the communication control unit 31 designates the target browser ID and the initial access URL to request the browser control unit 32 to activate the browser unit 33 identified or specified by the target browser ID (step S106). As described above, the initial access URL corresponds to the URL to be accessed by the browser unit 33 at first, and is pre-set in the browser control unit 32 in advance.

In response to receiving the request from the communication control unit 31 (step S106), the browser control unit 32 activates the browser unit 33 identified or specified by the target browser ID using the kiosk mode (step S107). At this stage, the browser control unit 32 inputs the initial access URL to the browser unit 33.

Then, in response to activating the browser unit 33 using the kiosk mode (step S107), the browser unit 33 transmits an HTTP request to the input initial access URL (step S108). The HTTP request includes the target browser ID.

In response to receiving the HTTP request from the browser unit 33 (step S108), the application determination unit 12 of the server 10 transmits a response (HTTP response) including a redirect request to the browser unit 33 (step S109). The redirect request includes a URL of an application (application URL) associated with the browser ID as a redirect destination. The redirect request further includes the target browser ID, included in the communication URL and the HTTP request, as notification information to the redirect destination. The communication URL corresponds to the URL of the communication control unit 31.

At this stage, the application determination unit 12 refers to the registration information storage unit 124 (FIG. 9) and the application information storage unit 121 (FIG. 10) to identify or specify the URL of the application associated with the target browser ID.

FIG. 9 is an example of information stored in the registration information storage unit 124. As indicated in FIG. 9, the registration information storage unit 124 stores, for example, registration ID, In-application ID, Out-application ID, and browser ID.

The In-application ID is an ID of an application (hereinafter, "application ID") that controls the input of image data for the service corresponding to the registration ID. For example, the In-application ID of "AP_upload" indicates the application ID of the upload application 13.

The Out-application ID is an application ID of an application that controls the output of image data for the service corresponding to the registration ID. For example, the Out-application ID of "AP_PhotoShow" indicates the application ID of the output application 14. In this description, the browser ID indicates the browser ID of the browser unit 33 corresponding to the registration ID.

FIG. 10 is an example of information stored in the application information storage unit 121. As indicated in FIG. 10, the application information storage unit 121 stores, for example, application ID, application type, and URL for each one of applications installed on the server 10.

The application type represents a type of an application identified or specified by the application ID based on a relationship with the processing of image data. "In" indicates that the application type is an application that controls the input of image data (corresponding to the above-described In-application ID). "Out" indicates that the application type is an application that controls the output of image data (corresponding to the above-described Out-application ID). The URL corresponds to the URL of the application identified or specified by the application ID.

Therefore, the application determination unit 12 refers to the registration information storage unit 124 (FIG. 9) to identify or specify an Out-application ID associated with the target browser ID, and then refers to the application information storage unit 121 (FIG. 10) to identify or specify a URL associated with the Out-application ID. In this example case, it is assumed that the target browser ID is "BROWSER1," and a URL (hereinafter, output application URL) of an application (i.e., output application 14) having the application ID of "AP_PhotoShow" is identified.

Further, the application determination unit 12 automatically generates the communication URL of the communication control unit 31 identified or specified by the target communication ID based on the address information associated with the target browser ID in the apparatus information storage unit 122 (FIG. 8).

Then, in accordance with the redirect request, the browser unit 33 transmits (redirects) an HTTP request to the output application URL used as the redirect destination that is the output application 14 (step S110). The HTTP request includes the communication URL and the browser ID included in the redirect request.

In response to receiving the HTTP request from the browser unit 33 (step S110), the output application 14 transmits a response including a script of "photo.js" and display data of "photo.html" to the browser unit 33 (step S111), in which the script of "photo.js" is used to cause the browser unit 33 connect with the communication URL included in the HTTP request, and the display data of "photo.html" is used to cause the browser unit 33 render a user interface used for outputting image data (e.g., slide show). The script and display data are examples of data indicating an execution request of specific processing to the intermediary apparatus 30. For example, the script can be another type of program, and the display data can be another type of data.

In response to receiving the response from the output application 14 (step S111), the browser unit 33 executes the script of "photo.js" included in the response to establish a communication path with the communication control unit 31 identified by the communication URL (step S112). The communication path is used as a communication path used for transmitting the notification, received by the communication control unit 31 from the server 10, to the browser unit 33. The communication path can use, for example, websocket.

Then, the browser unit 33 generates or renders screen image data (hereinafter, "projection screen") on a pre-set region of the memory 103 (e.g., video memory) based on the display data of "photo.html" included in the response (step S113). For example, the projection screen is a screen that serves as a frame screen, which is used to set the image data distributed from the server 10. The rendering content (i.e., projection screen) generated by the browser unit 33 is output to the projector 40 via an interface such as HDMI (registered trademark), and then the rendering content (i.e., projection screen) can be output (projected) using the projector 40.

Figure 11:
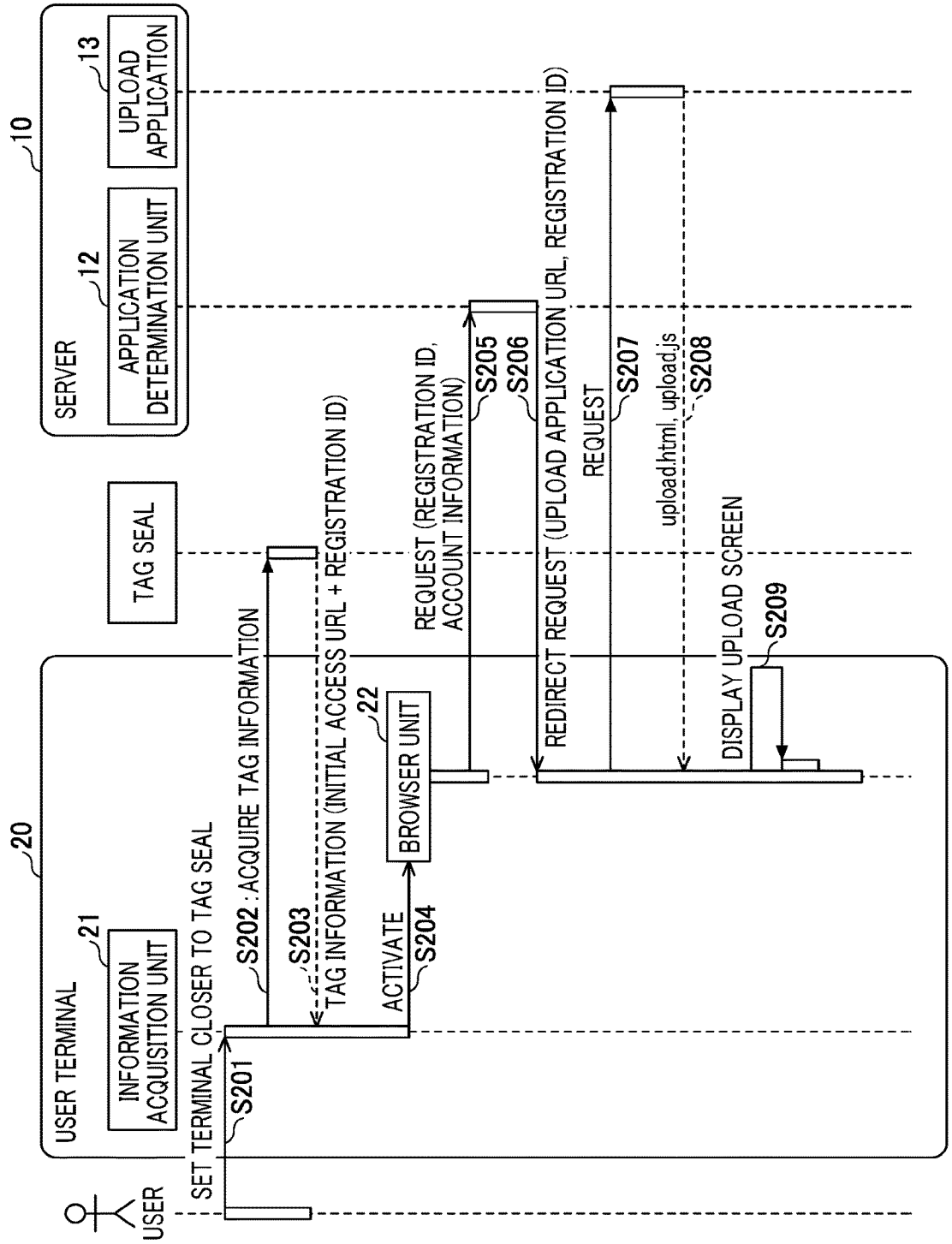
FIG. 11 is an example sequence diagram of processing, which is performed when a user terminal is placed closer to a tag seal.

FIG. 11 is an example sequence diagram of processing, which is performed when the user terminal 20 is placed closer to the tag seal.

When a user sets the user terminal 20 closer to the tag seal attached to the projector 40, such as placing the user terminal 20 over the projector 40 (step S201), the information acquisition unit 21 acquires the tag information stored in the tag seal via the short-range radio communication using the short-range wireless communication device 206 (steps S202, S203). The tag information includes the initial access URL assigned with the registration ID (hereinafter, "target registration ID") as optional information. In the embodiment, it is assumed that a value of the target registration ID is "Tag01."

Then, based on a condition that the URL is included in the tag information, the information acquisition unit 21 activates the browser unit 22 using the tag information as input information (step S204).

In response to the activation (step S204), the browser unit 22 automatically transmits an HTTP request to the application determination unit 12 corresponding to the initial access URL included in the tag information as the input information (step S205). The HTTP request includes account information as optional information in addition to the target registration ID. The account information includes, for example, information including identification information identifying a user of the user terminal 20 (hereinafter, "user ID") and the tenant ID identifying the user environment E1 where the user belongs to, or information capable of identifying or specifying the user ID and the tenant ID. For example, cookie can be used as the account information.

In response to receiving the HTTP request from the browser unit 22 of the user terminal 20 (step S205), the application determination unit 12 of the server 10 authenticates the account information included in the HTTP request. If the authentication is successful, step S206 and subsequent steps are performed. The authentication is performed, for example, by determining whether or not the account information included in the HTTP request is already registered in the user information storage unit 123 (FIG. 12).

Figures 12, 13:
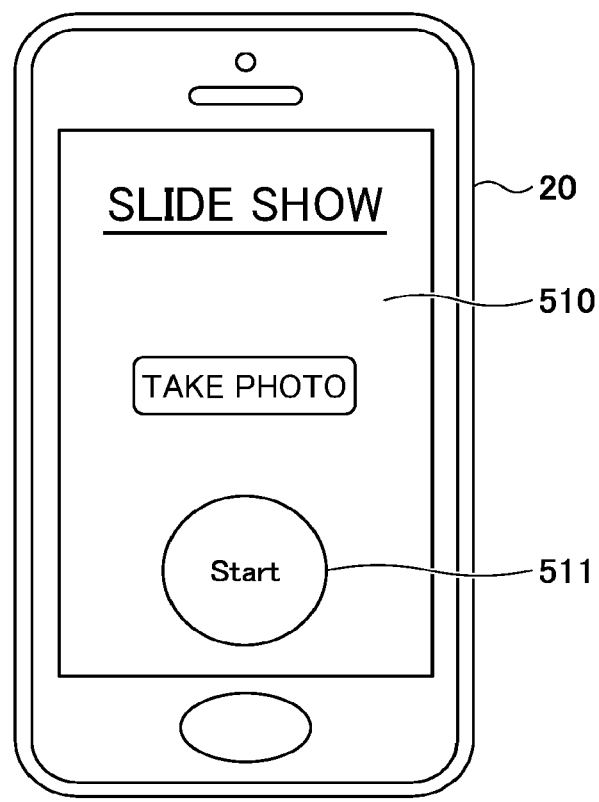
FIG. 12 is an example of information stored in a user information storage unit.
FIG. 13 is an example of display of an upload screen.

FIG. 12 is an example of information stored in the user information storage unit 123. As indicated in FIG. 12, the user information storage unit 123 stores, for example, tenant ID and user ID for each user who is allowed to use applications installed on the server 10.

If the authentication is successful in step S205, the application determination unit 12 transmits a response (HTTP response) including a redirect request to the browser unit 22 (step S206). The redirect request includes a URL of the upload application 13 (hereinafter, "upload application URL") identified or specified by the In-application ID of "AP_Upload" stored in the registration information storage unit 124 (FIG. 9) in association with the target registration ID of "Tag01" as the redirect destination. The upload application URL can be identified or specified by referring to the application information storage unit 121 (FIG. 10).

In accordance with the redirect request received from the application determination unit 12, the browser unit 22 transmits (redirects) an HTTP request to the upload application URL used as the redirect destination that is the upload application 13 (step S207).

In response to receiving the HTTP request from the browser unit 22 (step S207), the upload application 13 transmits display data of "upload.html" and a script of "upload.js" to the browser unit 22 (step S208), in which the display data of "upload.html" is used as screen image data (hereinafter, "upload screen") related to uploading of image data to the distribution unit 11 of the server 10, and the script of "upload.js" is used to cause the user terminal 20 execute the uploading of image data in response to a user operation on the "upload screen." The script and display data are examples of data indicating an execution request of the processing to the user terminal 20.

In response to receiving the response from the upload application 13 (step S208), the browser unit 22 generates the upload screen based on the display data of "upload.html" and displays the generated upload screen on the display device 211 (step S209).

FIG. 13 is an example of display of an upload screen 510. As indicated in FIG. 13, the upload screen 510 includes, for example, a start button 511. The start button 511 is an operation unit for receiving a start instruction of an image capture operation. When a user selects the start button 511 to perform the image capture operation, the captured image data is displayed on the display device 211 as a result.

Figure 14:
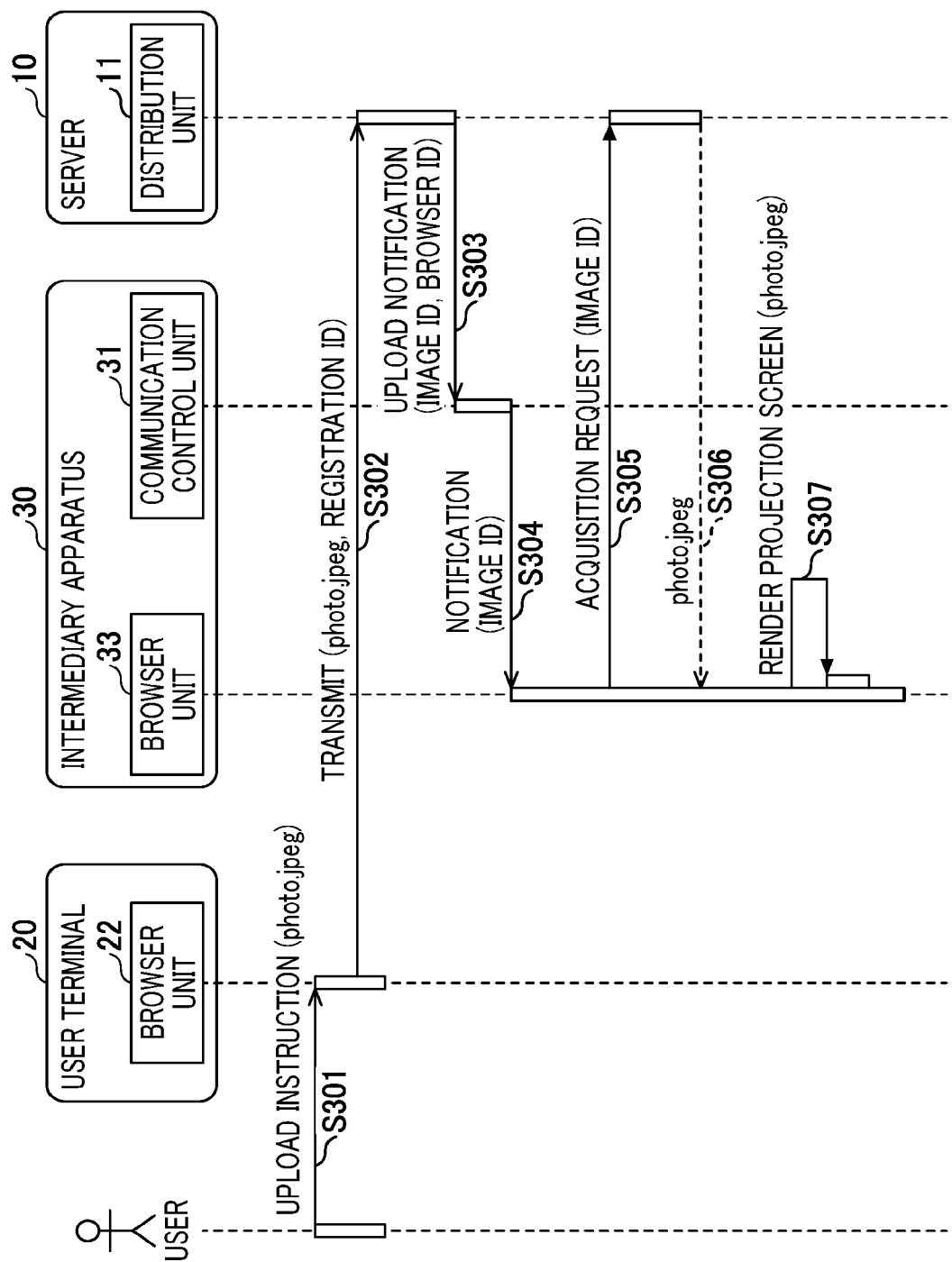
FIG. 14 is an example sequence diagram of distribution processing of image data from a user terminal to an intermediary apparatus.

FIG. 14 is an example sequence diagram of distribution processing of image data from the user terminal 20 to the intermediary apparatus 30.

When a user performs a specific operation (e.g., swiping) corresponding to an upload instruction for the image data (hereinafter, "target image data") being displayed on the display device 211 of the user terminal 20 (step S301), the browser unit 22 transmits (uploads), to the distribution unit 11 of the server 10, the target image data of "photo.jpeg" and the target registration ID based on the definition of the script of "upload.js" (step S302).

In response to receiving the target image data and the target registration ID from the user terminal 20 (step S302), the distribution unit 11 assigns identification information (hereinafter, "image ID") to the target image data, and associates the target image data with the image ID (hereinafter referred to as "target image ID") and stores the target image data and the target image ID in, for example, the auxiliary storage device 102.

Then, the distribution unit 11 specifies the browser ID (target browser ID) stored in the registration information storage unit 124 (FIG. 9) in association with the target registration ID. The distribution unit 11 uses the communication path, which is established in step S102 (FIG. 7), with the communication control unit 31 identified or specified by the communication ID (i.e., target communication ID), stored in the apparatus information storage unit 122 (FIG. 8) in association with the target browser ID, to transmit a notification that the image data has been uploaded (hereinafter, "upload notification") to the communication control unit 31 (step S303). The upload notification includes the target image ID and the target browser ID.

In response to receiving the upload notification from the server 10 (step S303), the communication control unit 31 uses the communication path established between the communication control unit 31 and the browser unit 33 identified or specified by the browser ID included in the upload notification (i.e., the communication path is established in step S112 of FIG. 7) to notify the target image ID included in the upload notification to the browser unit 33 (step S304).

In response to receiving the notification from the communication control unit 31 (step S304), the browser unit 33 transmits, to the distribution unit 11, an acquisition request for acquiring the image data in accordance with the definition of the script of "photo.js" (step S305). The acquisition request includes the target image ID.

In response to receiving the acquisition request from the browser unit 33 (step S305), the distribution unit 11 transmits, to the browser unit 33, a response including the image data of "photo.jpeg" associated with the target image ID included in the acquisition request (step S306).

In response to receiving the image data from the distribution unit 11 (step S306), the browser unit 33 renders the image data in the pre-set region of the memory 103 (e.g., video memory) so that the image data is set in the projection screen generated in step S113 of FIG. 7 (step S307). Further, the rendering content is transmitted to the projector 40 via the image interface 305 or the communication interface 304 of the intermediary apparatus 30. As a result, the rendering content can be projected on a screen (e.g., wall) using the projector 40.

By performing the above-described processing, a service of outputting the image data using the output apparatus (e.g., projector 40) can be implemented each time the user terminal 20 captures the image data. For example, by using the service of outputting the image data using the output apparatus disposed at any location, such as parties, seminars, exhibition halls or the like, the image data captured in these locations can be sequentially displayed on a large display screen.

In the above described configuration, the output apparatus connected to the intermediary apparatus 30 is the projector 40, but not limited thereto. For example, another apparatus, such as digital signage, electronic whiteboard, display, or printer can be connected to the intermediary apparatus 30 instead of the projector 40. In this case, the rendering content of the intermediary apparatus 30 can be displayed on the digital signage, the electronic blackboard, and the display, or can be printed by the printer.

Further, in the above described configuration, the tag seal is attached to the projector 40 associated with the tag seal, but not limited thereto. For example, the tag seal can be attached to any location. For example, the tag seal can be attached to any portion in a location (e.g., room) where the projector 40 is located.

As to the above described first embodiment, when a user places the user terminal 20 closer to the tag seal, the user can execute pre-set processing associated with the tag seal (i.e., registration ID), using the apparatus (e.g., projector 40) connected to the intermediary apparatus 30. That is, the user does not need to directly operate the projector 40 but can operate the projector 40 indirectly by performing an operation at the user terminal 20, with which operability of the target apparatus, such as the projector 40, can be improved.

Further, the screen displayed on the user terminal 20 can be generated from the display data (e.g., HTML data) distributed from the server 10, in which the screen displayed on the user terminal 20 has lesser dependency to the apparatus or device associated with the tag seal. Accordingly, as to the first embodiment, the user can reduce workloads of operating various types of user interfaces, such as various operation panels different for various apparatuses or devices, with which the user can use each apparatus or device by performing an operation, which are highly common to a plurality of apparatuses or devices.

Further, by interposing the intermediary apparatus 30 between the server 10 and the target apparatus (e.g., projector 40), even if the target apparatus (e.g., projector 40) does not have a network function, the above described embodiment can be applied to any apparatus having an interface that can transmit the image data.

Further, if the user wants to switch the output destination of image data from one apparatus to another apparatus, the switching of apparatuses can be performed by switching from one set of the intermediary apparatus 30 and the apparatus connected with each other to another set of the intermediary apparatus 30 and the apparatus connected with each other, in which there is no need to change the setting information in the server 10.

Further, in the above described first embodiment, the user terminal 20, such as a smart phone installed with programs can be used, and the user terminal 20 is not required to be installed with special applications.

Further, since the intermediary apparatus 30 and the target apparatus (e.g., projector 40) can be connected using an interface for transmitting the image data, for example, settings required for wireless LAN connection via a router or settings required for wired LAN connection are not required.

Further, in the first embodiment, the NFC tag is used as an example of the external recording medium storing the tag information, but not limited thereto. As long as the user terminal 20 can acquire the tag information from an external source disposed outside the user terminal 20, any method other than the short-range wireless communication can be employed. For example, a seal recorded with the tag information using a printed bar code or two-dimensional code can be used instead of the tag seal. In this case, the user terminal 20 can acquire the tag information using a bar code reader, a two-dimensional code reader, or the digital camera 207. The bar code or the two-dimensional code are not necessarily printed on the seal. For example, the bar code or the two-dimensional code can be displayed on a display of the output apparatus or target apparatus, or can be printed on any external recording medium other than the output apparatus or the seal. The tag seal using the NFC tag described above is merely an example, which means the external recording medium other than the seal can include the NFC tag.

Further, the user terminal 20 can be configured to receive acoustic waves or beacons to be described later, which are transmitted from a transmission device disposed at the periphery of the output or target apparatus or inside the output or target apparatus to acquire the tag information embedded in the received acoustic waves or beacons.

Further, the user terminal 20 can be configured to access an external apparatus disposed at the periphery of the output apparatus or the output apparatus itself via a network to acquire the tag information stored in the external apparatus or the output apparatus.

Further, the user terminal 20 can be configured to acquire the tag information from any external recording medium (e.g., seal) printed with an image. In this case, the user terminal 20 can acquire the image using the digital camera 207 and extract the tag information from a background pattern embedded in the image. Known techniques can be used to embed information (e.g., background pattern) in the image, and known techniques can be used to extract information from the background pattern.

Second Embodiment

Hereinafter, a description is given of a second embodiment with reference to FIG. 15. The second embodiment describes different aspects with respect to the first embodiment. Therefore, the points same as in the first embodiment may not be specifically described.

In the second embodiment, a message application, such as LINE (registered trademark) is used. In the second embodiment, instead of the tag seal, a beacon using the short-range wireless communication including the registration ID, such as a beacon for a message application 23 is used. For example, the beacon can use Bluetooth (registered trademark) Low Energy (BLE) used for the short-range wireless communication. Hereinafter, the beacon is referred to as a "message beacon."

Figure 15:
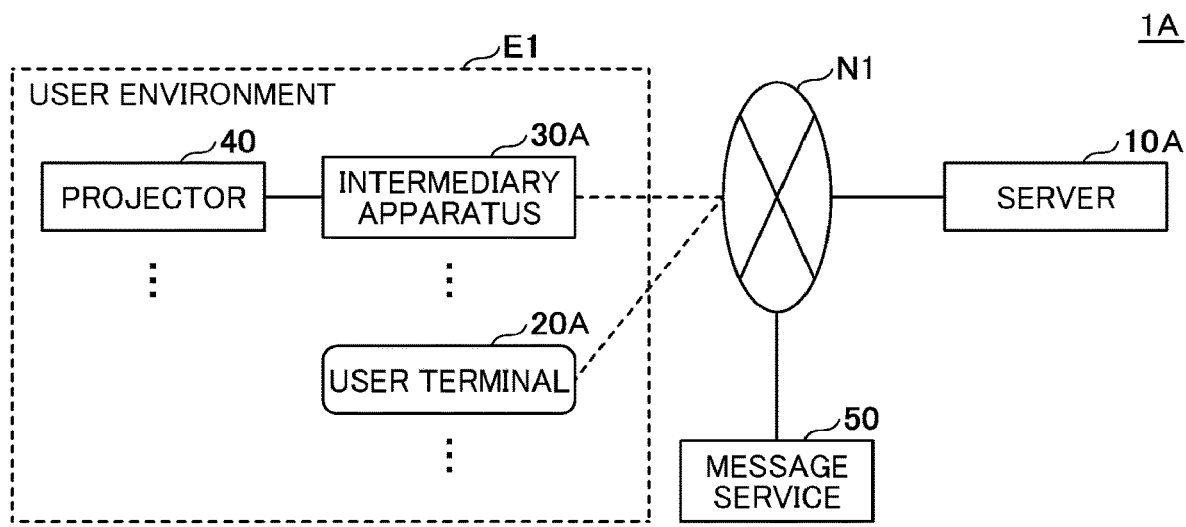
FIG. 15 is an example block diagram of an information processing system according to a second embodiment.

FIG. 15 is an example block diagram of an information processing system 1A according to the second embodiment. In FIG. 15, the same units as those in FIG. 1 are denoted by the same reference numerals, and the description thereof will be omitted.

As indicated in FIG. 15, a message service 50 is further connected to the network N1. The message service 50 is one or more computers that provide one or more services to a message application 23 (see FIG. 17), in which the message service 50 serves as a server for the message application 23. A user of the message application 23 performs a user registration to the message service 50 and then receives a user ID for the message application 23, issued by the message service 50.

Figure 16:
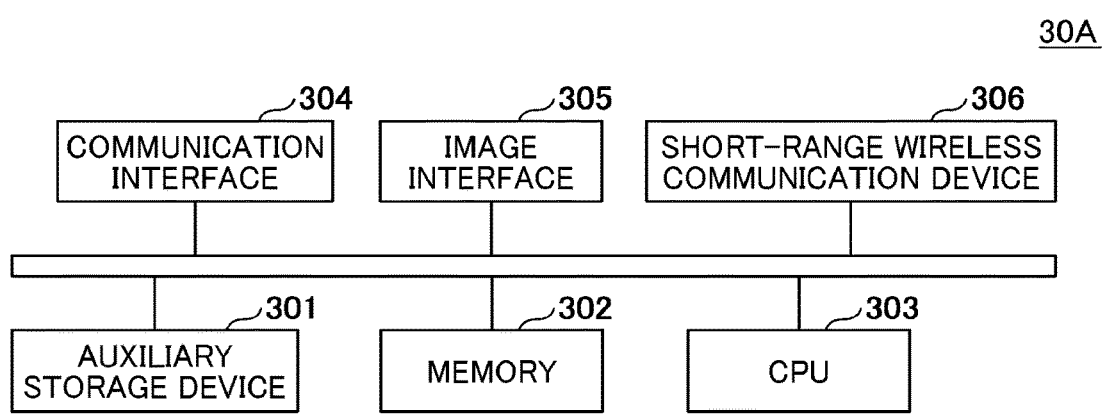
FIG. 16 is an example block diagram of a hardware configuration of an intermediary apparatus according the second embodiment.

FIG. 16 is an example block diagram of a hardware configuration of an intermediary apparatus 30A according to the second embodiment. In FIG. 16, the same units as those in FIG. 4 are denoted by the same reference numerals, and the description thereof will be omitted. As indicated in FIG. 16, the intermediary apparatus 30A further includes a short-range wireless communication device 306. The short-range wireless communication device 306 is a hardware resource for performing the short-range wireless communication, such as BLE. In the second embodiment, the short-range wireless communication device 306 is used to transmit a message beacon.

Figure 17:
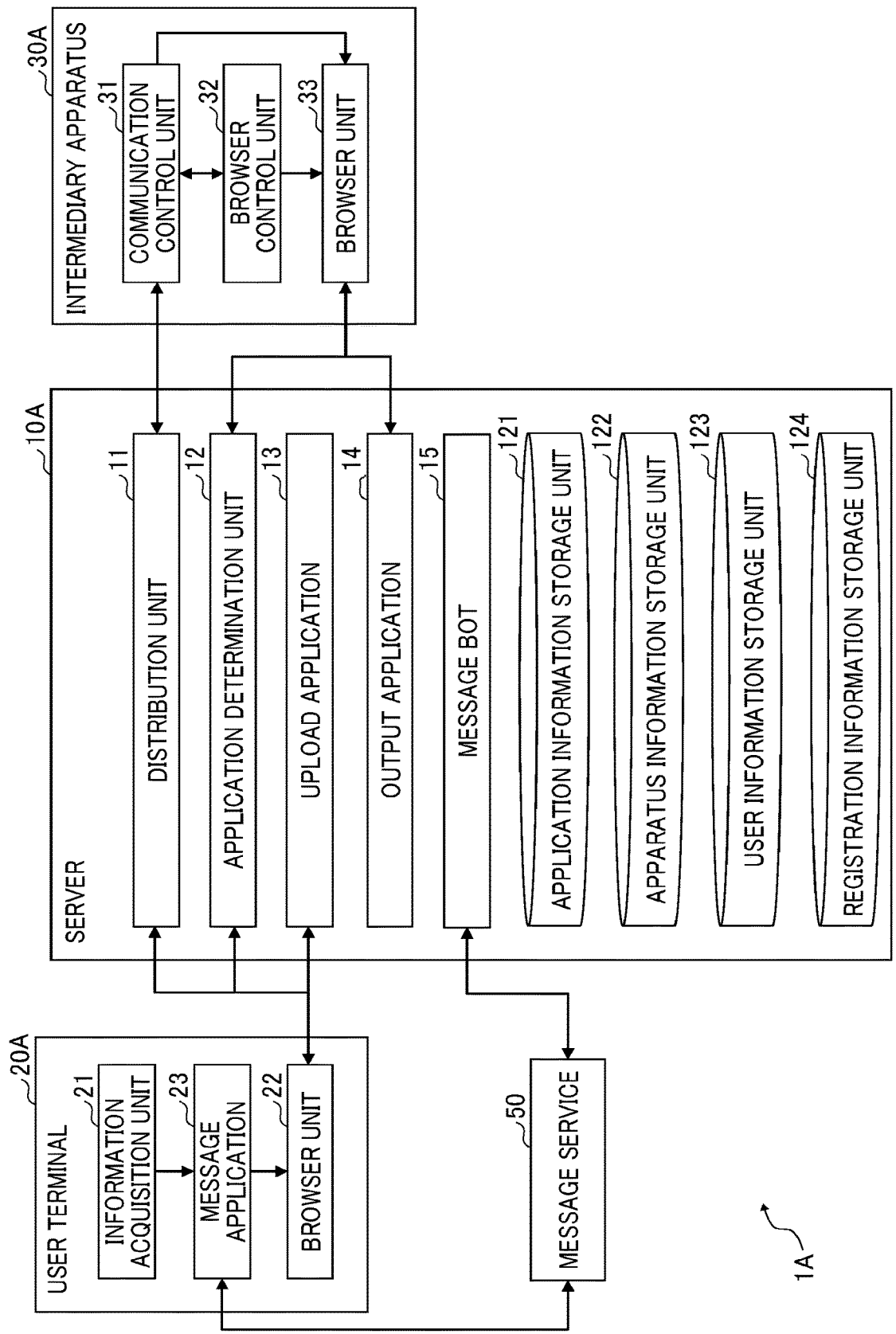
FIG. 17 is an example block diagram of a functional configuration of each apparatus in the information processing system according to the second embodiment.

FIG. 17 is an example block diagram of a functional configuration of each apparatus in the information processing system 1A according to the second embodiment. In FIG. 17, the same units as those in FIG. 6 are denoted by the same reference numerals, and the description thereof will be omitted.

As indicated in FIG. 17, the user terminal 20A further includes the message application 23. The message application 23 is described as above.

As indicated in FIG. 17, the server 10A further includes a message bot 15. The message bot 15 is a program (bot) that automatically executes transmission and reception of messages with the message application 23.

Figure 18:
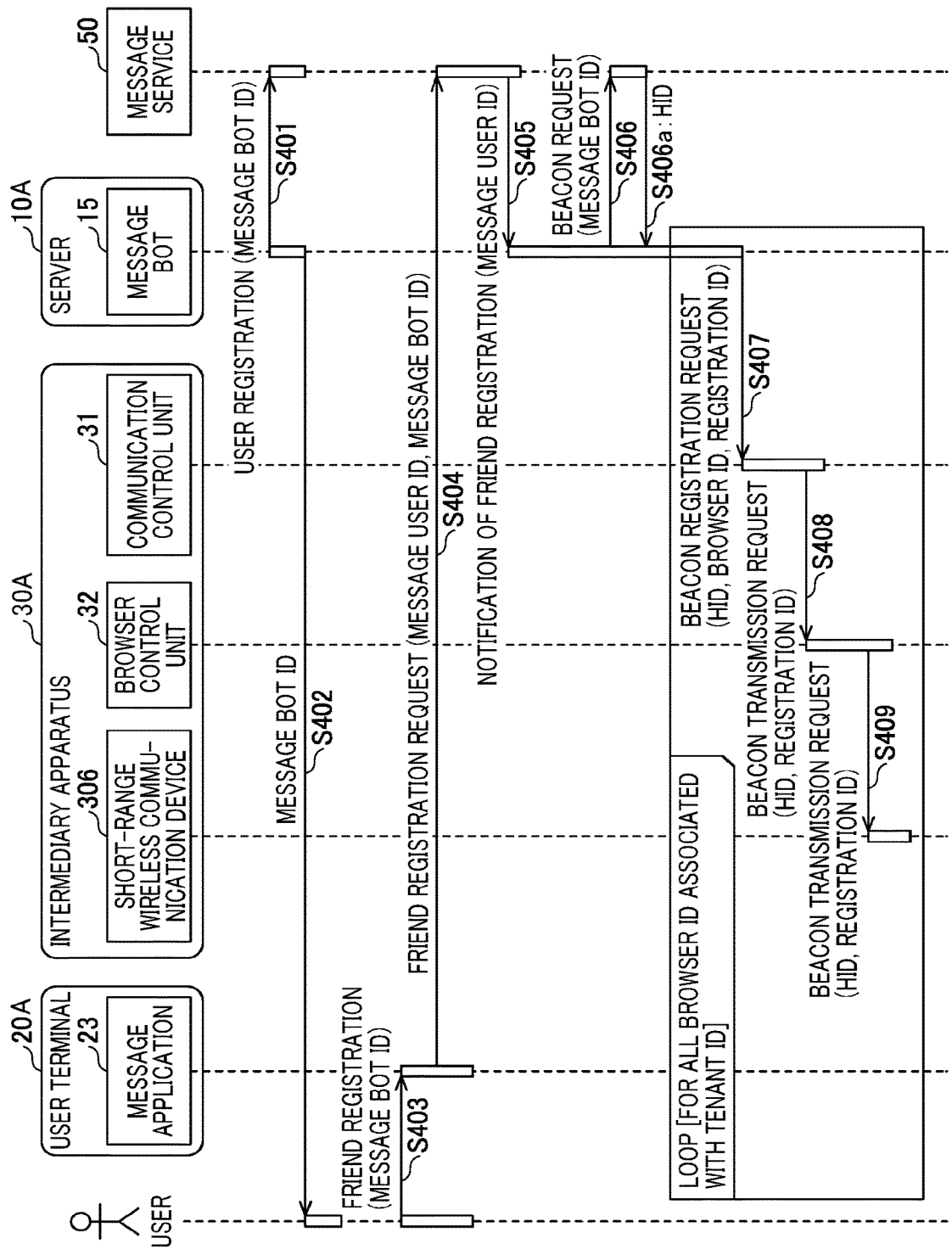
FIG. 18 is an example sequence diagram of preparatory processing according to the second embodiment.

FIG. 18 is an example sequence diagram of preparatory or preliminary processing according to the second embodiment. In the second embodiment, the processing illustrated in FIG. 18 is performed as the preparatory or preliminary preparation processing.

In step S401, the message bot 15 is registered to the message service 50 as a user, and a user ID (hereinafter, "message bot ID") is issued to the message bot 15.

Then, the message bot ID is notified to the user terminal 20A to inform the message bot ID to the user using the user terminal 20A (step S402) from the server 10A. For example, an e-mail or QR code (registered trademark) including the message bot ID is transmitted to the user terminal 20A from the server 10A.

If the user inputs the notified message bot ID into the message application 23 of the user terminal 20A and instructs a friend registration to the message application 23 (step S403), the message application 23 transmits, to the message service 50, a friend registration request including the user ID of the user related to the message application 23 (hereinafter, "message user ID") and the input message bot ID (step S404). By performing the friend registration, the message application 23 can receive the notification (message) from the message bot 15 immediately.

In response to receiving the friend registration request from the user terminal 20A (step S404), the message service 50 notifies, to the message bot 15 identified or specified by the message bot ID included in the friend registration request, that the user identified or specified by the message user ID included in the friend registration request is registered as one friend (step S405).

Then, the message bot 15 transmits, to the message service 50, a beacon request including the message bot ID to enable to transmit a message beacon from the intermediary apparatus 30A (step S406), and then the message bot 15 receives, from the message service 50, Hardware ID (hereinafter, "HID") to be included in the message beacon (step S406a), in which the HID is issued by the message service 50.

Then, the message bot 15 transmits a beacon registration request of the beacon for transmitting the message beacon to the communication control unit 31 of the intermediary apparatus 30A identified or specified by the tenant ID corresponding to the message user ID used for the friend registration of the message bot 15 (step S407). The beacon registration request includes the HID, the browser ID corresponding to the tenant ID, and the registration ID corresponding to the browser ID. The tenant ID corresponding to the message user ID can be identified or specified by referring to the user information storage unit 123 (see FIG. 19).

FIG. 19 is an example of information stored in the user information storage unit 123 according to the second embodiment. As indicated in FIG. 19, in the second embodiment, the user information storage unit 123 stores tenant ID, user ID, and message user ID in association with each other. Therefore, the message bot 15 can identify or specify a specific tenant ID corresponding to a specific message user ID by referring to the user information storage unit 123 (FIG. 19).

Further, a specific browser ID corresponding to the specific tenant ID can be identified or specified by referring to the apparatus information storage unit 122 (FIG. 8). Further, a specific registration ID corresponding to the specific browser ID can be identified or specified by referring to the registration information storage unit 124 (FIG. 9).

Then, in response to receiving the beacon registration request from the message bot 15 of the server 10A (step S407), the communication control unit 31 requests the browser control unit 32, corresponding to the browser unit 33 identified or specified by the browser ID included in the beacon registration request, to transmit a beacon including the target registration ID and the HID (step S408).

Then, the browser control unit 32 requests the short-range wireless communication device 306 to transmit a message beacon including the target registration ID and the HID (step S409). As a result, the short-range wireless communication device 306 of the intermediary apparatus 30 starts to transmit the message beacon including the target registration ID and the HID.

Figure 20:
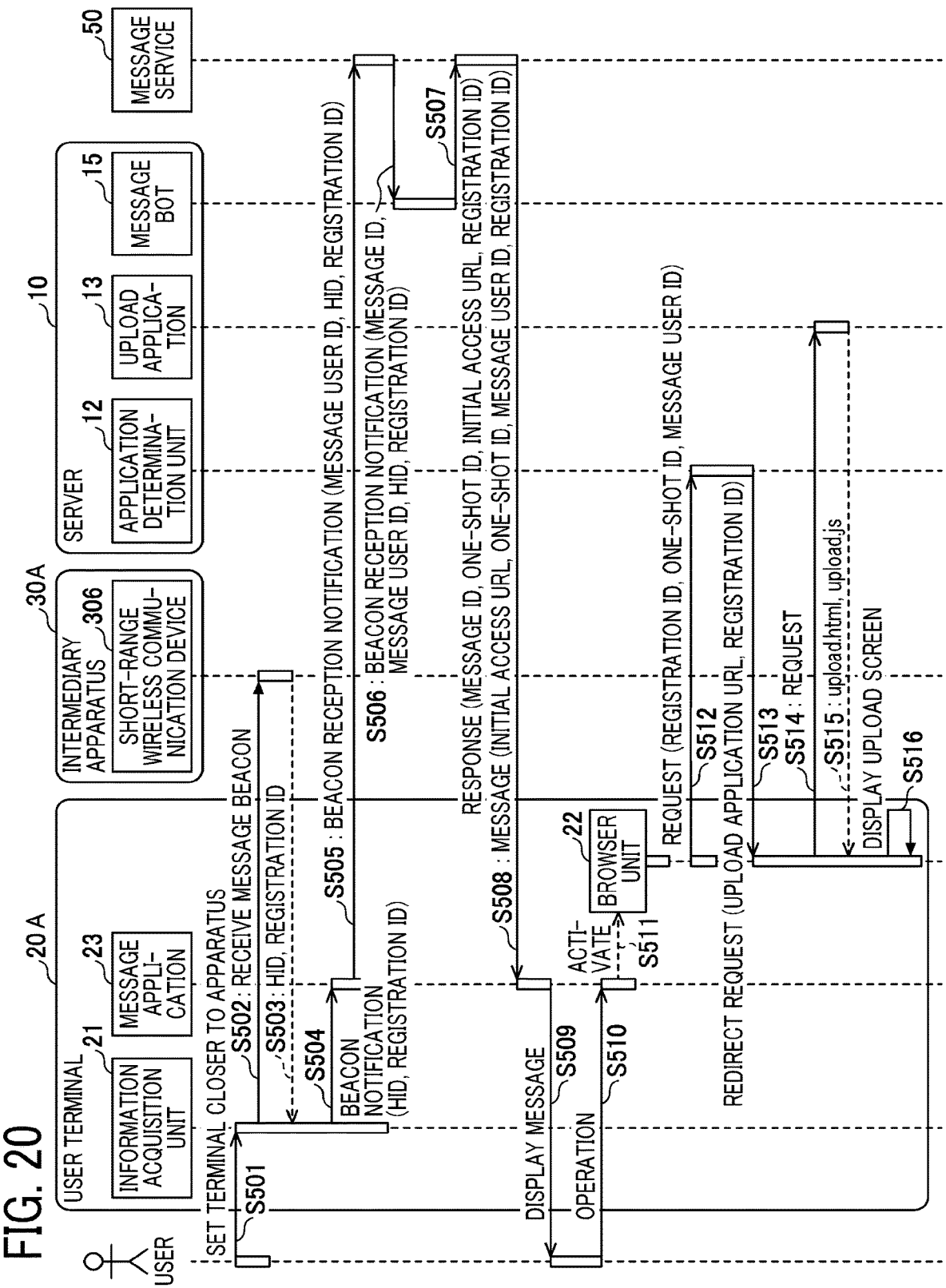
FIG. 20 is an example sequence diagram of processing, which is performed when a user terminal is placed closer to a transmission source of a message beacon according to the second embodiment.

FIG. 20 is an example sequence diagram of processing, which is performed when the user terminal 20 is placed closer to the proximity of a transmission source of a message beacon. Before performing the sequence of FIG. 20, the sequence of FIG. 7 and FIG. 18 are already performed.

When a user places the user terminal 20 closer to the intermediary apparatus 30 that is transmitting the message beacon (step S501), the information acquisition unit 21 of the user terminal 20 receives the message beacon using the short-range wireless communication device 206 (step S502), and then the information acquisition unit 21 acquires the HID (hereinafter, "target HID") and the registration ID (hereinafter, "target registration ID") included in the message beacon (step S503). In other words, in the second embodiment, the short-range wireless communication device 206 is a hardware resource capable of receiving the beacon using BLE or the like, which is being transmitted by the short-range wireless communication device 306 of the intermediary apparatus 30. In the second embodiment, it is assumed that a value of the target registration ID is "Tag01."

Since a format of the message beacon is compatible to a format of the message application 23, the information acquisition unit 21 notifies the content of the message beacon (i.e., target HID, target registration ID) to the message application 23 of the user terminal 20 (step S504).

Then, in response to receiving the content of the message beacon from the information acquisition unit 21 (step S504), the message application 23 transmits, to the message service 50, a notification (hereinafter, "beacon reception notification") that the message application 23 has received the message beacon (step S505). At this stage, the message application 23 generates the beacon reception notification including the message user ID of the user using the user terminal 20, the target HID, and the target registration ID.

Then, the message service 50 transmits the beacon reception notification to the message bot 15 corresponding to the target HID (step S506). That is, the message service 50 controls or manages the message bot 15 that have received the issued HID, in association with the HID. Further, the beacon reception notification also includes a message ID identifying the beacon reception notification. The message service 50 stores the content (e.g., message user ID) included in the beacon reception notification in association with the message ID.

In response to receiving the beacon reception notification from the message service 50 (step S506), the message bot 15 transmits, to the message service 50, a response to the beacon reception notification (step S507). The response includes one-shot ID and the initial access URL in addition to the message ID and the target registration ID included in the beacon reception notification. The initial access URL corresponds to the URL to the application determination unit 12 as described in the first embodiment. In the second embodiment, the initial access URL is set in the message bot 15 in advance. Further, the one-shot ID represents identification information for limiting a login-allowable time period to the server 10, and is automatically generated by the message bot 15. For example, the one-shot ID can be set with a value based on the current date and time, or a value based on the date and time indicating the login-allowable time period. In a case that the login-allowable time period to the server 10 is not set, the one-shot ID may not be generated.

Then, in response to receiving the response from the message bot 15 (step S507), the message service 50 transmits to the message user ID stored in association with the message ID included in the response, a message including the content of the response received from the message bot 15 (i.e., initial access URL, one-shot ID, message user ID, target registration ID) as a message from the message bot 15 (step S508) For example, the message includes an operation button that is associated with a link for the initial access URL including the one-shot ID, the message user ID, and the target registration ID as optional information.

When the message application 23 of the user terminal 20 used by the user, corresponding to the message user ID, receives the message from the message service 50 (step S508), the message application 23 displays the message on the display device 211 (step S509). As a result, the user can confirm the message.

Then, if the user operates (e.g., presses) the operation button included in the message (step S510), the message application 23 automatically activates the browser unit 22 using the initial access URL indicated by the link, associated with the operation button, as the input information (step S511). If the message application 23 has a browser inside the message application 23, the browser of the message application 23 can be used as the browser unit 22.

In response to the activation of the browser unit 22 (step S511), the browser unit 22 automatically transmits an HTTP request to the application determination unit 12 corresponding to the initial access URL included in the input information (step S512). The HTTP request includes optional information of the initial access URL, such as one-shot ID, message user ID, and target registration ID.

In response to receiving the HTTP request from the browser unit 22 (step S512), the application determination unit 12 of the server 10 authenticates the message user ID and the one-shot ID included in the HTTP request. For example, if a specific message user ID is already stored in the user information storage unit 123 (FIG. 19) as the message user ID of any one of users and the expiration date of the one-shot ID is not yet expired, the application determination unit 12 successfully authenticates the specific message ID (authentication succeeds). By contrast, if the specific message user ID is not stored in the user information storage unit 123 (FIG. 19) as the message user ID of any one of users or the expiration date of the one-shot ID is expired, the application determination unit 12 does not authenticate the specific message ID (authentication fails).

If the authentication is successful in step S512, the processing similar to steps S206 to S209 in FIG. 11 are performed in step S513 to S516. As a result, the upload screen 510 (FIG. 13) is displayed on the display device 211 of the user terminal 20.

Then, in response to capturing the image data using the user terminal 20, the sequence described in FIG. 14 is performed.

As described above, in the second embodiment, the same effect as that of the first embodiment can be obtained without using the tag seal Third Embodiment Hereinafter, a description is given of an information processing system 1B of a third embodiment with reference to FIG. 21. The third embodiment will be described different aspects with respect to the first embodiment. Therefore, the points same as in the first embodiment may not be specifically described.

In the first and second embodiments, the application ID (In-application ID) of the application used for controlling the input of image data, the application ID (Out-application ID) of the application used for controlling the output of the image data, and the browser ID are registered for the registration ID (e.g., tag seal) and stored in the registration information storage unit 124 (FIG. 9).

However, the association of these IDs (e.g., the service implemented by these applications) and the registration ID (e.g., tag seal) may not be necessarily performed before the user terminal 20 is set closer to the tag seal. For example, these IDs can be associated with the registration ID of an unregistered tag seal when a user places or sets the user terminal 20 closer to the unregistered tag seal. The unregistered tag seal means that the registration ID of the concerned tag seal is not yet registered (stored) in the registration information storage unit 124 (FIG. 9). Hereinafter, a description is given of the third embodiment when the user places or sets the user terminal 20 closer to the unregistered tag seal.

Figure 21:
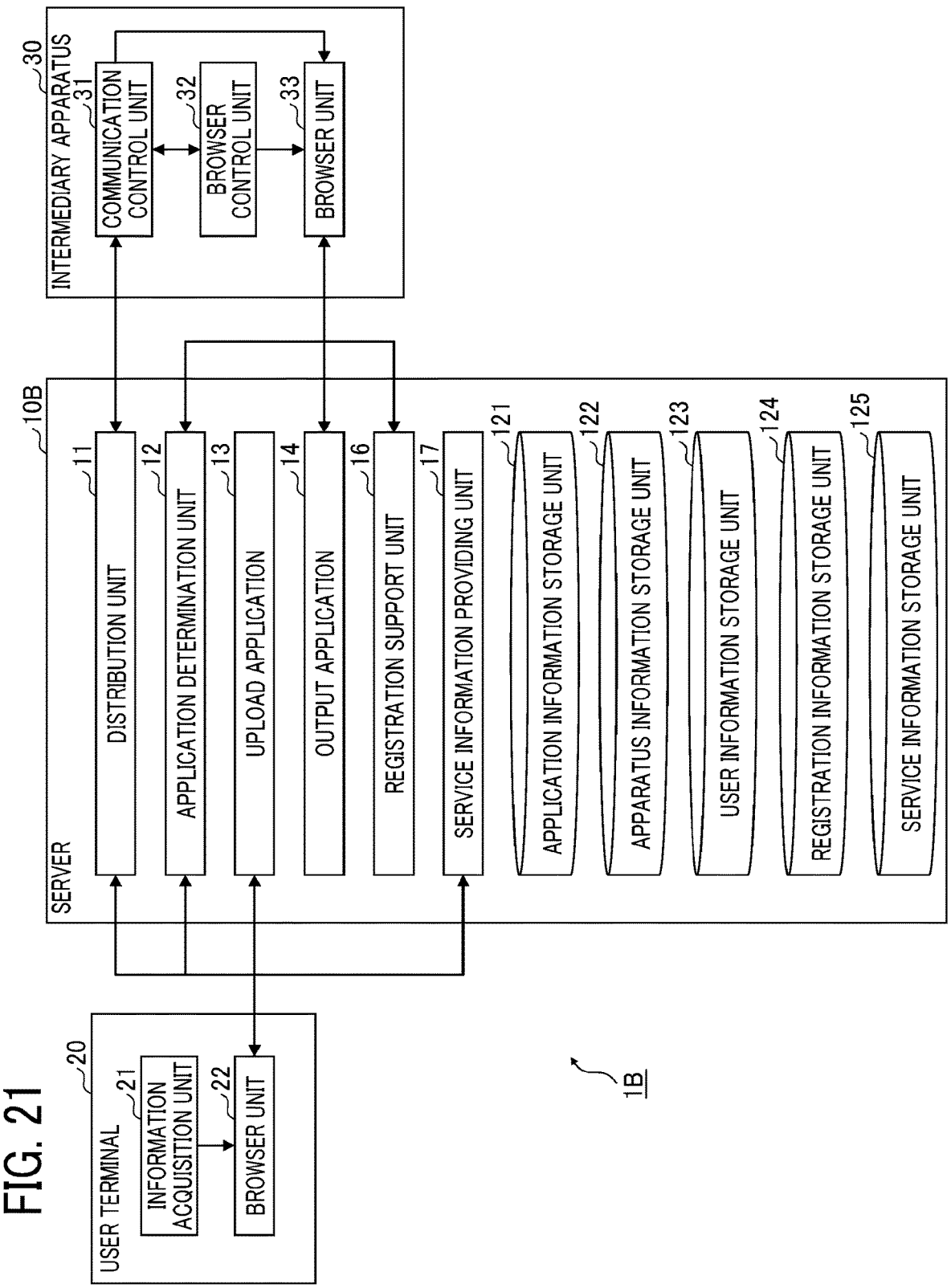
FIG. 21 is an example block diagram of a functional configuration of each apparatus in an information processing system according to a third embodiment.

FIG. 21 is an example block diagram of a functional configuration of each apparatus in the information processing system 1B according to the third embodiment. In FIG. 21, the same units as those in FIG. 6 are denoted by the same reference numerals, and the description thereof will be omitted.

As indicated in FIG. 21, a server 10B further includes a registration support unit 16 and a service information providing unit 17. These functions can be implemented by executing one or more programs installed on the server 10 using the CPU 104.

The registration support unit 16 performs processing to support the registration of the unregistered tag seal (registration ID). The service information providing unit 17 provides information on one or more candidate services (selectable options) to be associated with the unregistered tag seal (registration ID) to the user terminal 20.

Hereinafter, the registration support unit 16 and the service information providing unit 17 are described with reference to an example case, in which the registration support unit 16 is implemented by a registration support application and the service information providing unit 17 is implemented by a service information providing application. Since each of the applications is an example of one program, the registration support unit 16 and the service information providing unit 17 can be implemented using another programs, or the registration support unit 16 and the service information providing unit 17 can be implemented by the same application.

As indicated in FIG. 21, the server 10B further includes a service information storage unit 125. The service information storage unit 125 can be implemented by, for example, the auxiliary storage device 102 or a storage device that can be connected to the server 10 via the network. The service information storage unit 125 stores information on each service that can be provided by the server 10B.

Figure 22:
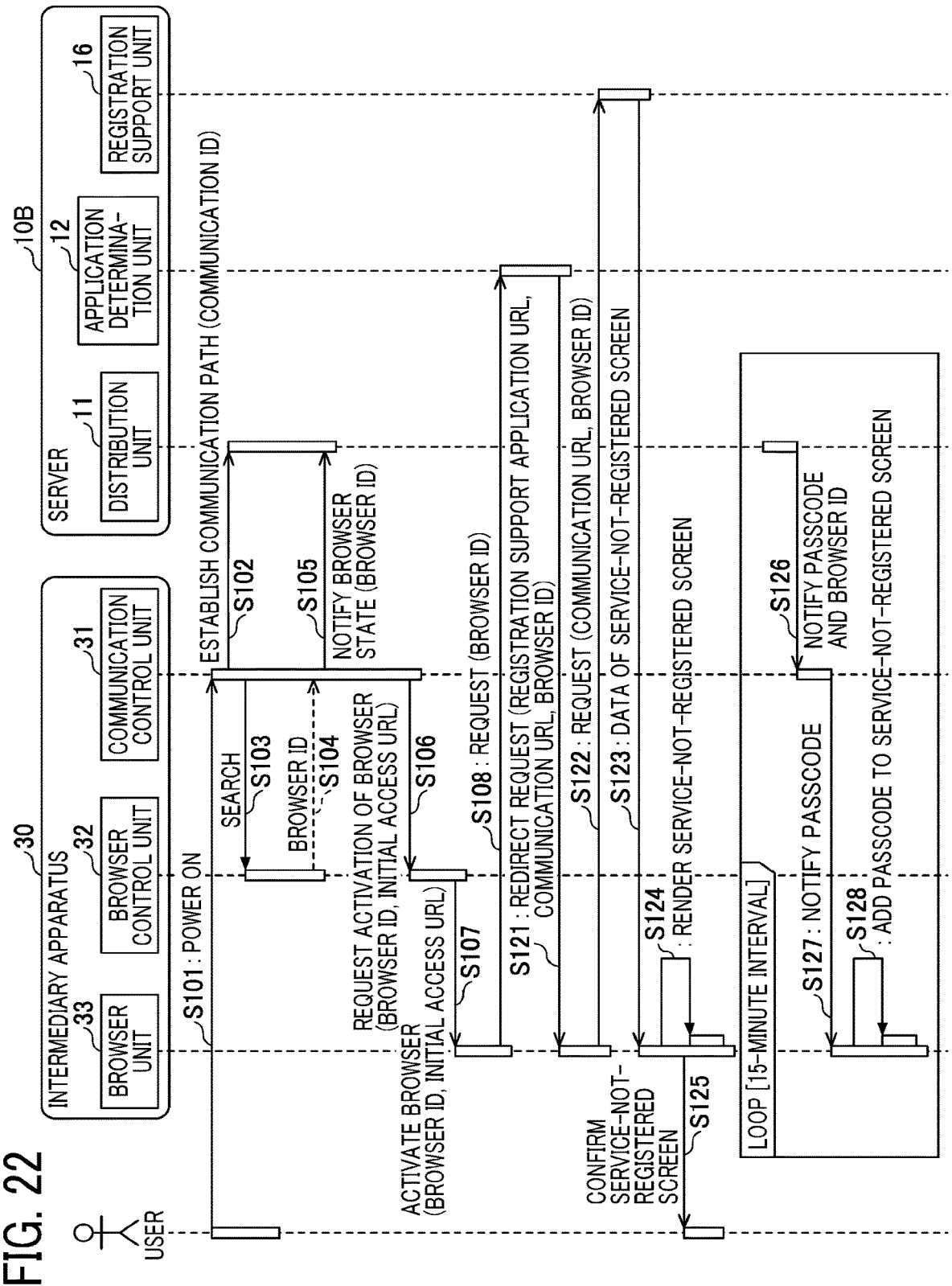
FIG. 22 is an example sequence diagram of a processing, which is performed when an intermediary apparatus is activated according to the third embodiment.

FIG. 22 is an example sequence diagram of a processing, which is performed when the intermediary apparatus 30 is activated according to the third embodiment. In FIG. 22, the same steps as those in FIG. 7 are denoted by the same step numbers, and the description thereof will be omitted.

When the application determination unit 12 of the server 10B receives the HTTP request in step S108, if a record including the target browser ID (i.e., the registration ID associated with the target browser ID) is not yet registered or stored in the registration information storage unit 124 (FIG. 9) (i.e., if the projector 40 identified or specified by the target browser ID is not yet associated with any service), the application determination unit 12 of the server 10 transmits, to the browser unit 33 of the intermediary apparatus 30, a request (HTTP request) including a redirect request including a registration support application URL, a communication URL and the target browser ID (step S121). The registration support application URL corresponds to the URL of the registration support unit 16 (i.e., registration support application).

Then, in accordance with the redirect request received from the application determination unit 12 of the server 10B (step S121), the browser unit 33 of the intermediary apparatus 30 transmits (redirects) a HTTP request to the registration support application URL used as a redirect destination (i.e., an access point of the registration support unit 16) (step S122). The HTTP request includes the communication URL and the target browser ID included in the redirect request.

In response receiving to the HTTP request from the browser unit 33 of the intermediary apparatus 30 (step S122), the registration support unit 16 of the server 10B transmits, to the browser unit 33 of the intermediary apparatus 30, a response including display data (e.g., HTML and script) of a screen indicating that a service is not yet registered for the concerned tag seal (step S123).

Then, the browser unit 33 of the intermediary apparatus 30 renders, on the pre-set region of the memory 103 (e.g., video memory), screen image data based on the display data included in the response (step S124). Hereinafter, this screen is referred to as "service-not-registered screen."

Then, the intermediary apparatus 30 outputs the rendering content (projection screen) rendered by the browser unit 33 to the projector 40 via an interface, such as HDMI (registered trademark), and then the rendering content is output (projected) using the projector 40 (step S125).

Figure 23:
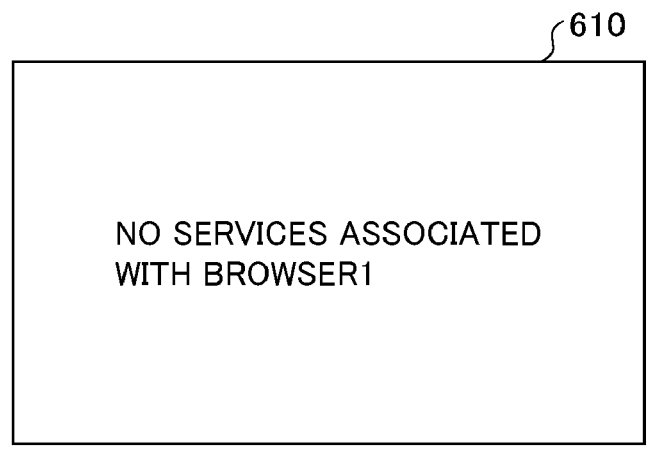
FIG. 23 is an example of output of a service-not-registered screen according to the third embodiment.

FIG. 23 is an example of output of a service-not-registered screen 610. As indicated in FIG. 23, the service-not-registered screen 610 includes, for example, a message indicating no services are associated with the browser unit 33 of the intermediary apparatus 30.

The user refers to the service-not-registered screen 610 and confirms that the service is not associated and registered with the browser unit 33 of the intermediary apparatus 30 being supplied with power (step S125 in FIG. 22).

Further, after establishing the communication path in step S102, the distribution unit 11 of the server 10B generates a passcode (e.g., generates randomly) corresponding to the browser unit 33 of the intermediary apparatus 30 with a given time interval (e.g., 15-minute interval), and then notifies the generated passcode and the target browser ID to the communication control unit 31 of the intermediary apparatus 30 via the communication path (step S126 in FIG. 22). That is, the passcode can be switched at a pre-set time interval. The distribution unit 11 of the server 10B associates the last-notified passcode with the target browser ID, and stores the last-notified passcode and the target browser ID in, for example, the apparatus information storage unit 122 (see FIG. 24).

FIG. 24 is an example of information stored in the apparatus information storage unit 122 according to the third embodiment. In the third embodiment, the apparatus information storage unit 122 further includes a column of passcode (hereinafter, passcode column). In this example case, the passcode that is notified last to the communication control unit 31 is stored in the passcode column of the record corresponding to the target browser ID. In an example case of FIG. 24, the target browser ID is "BROWSER1" and the passcode is "1965." The passcode is used as information identifying or specifying the intermediary apparatus 30 (browser unit 33) and the projector 40, which are associated with the passcode transmitted from the user terminal 20, in the processing to be described later.

Each time the communication control unit 31 of the intermediary apparatus 30 receives the passcode from the distribution unit 11 of the server 10B (step S126 in FIG. 22), the communication control unit 31 notifies the passcode to the browser unit 33 identified or specified by the target browser ID, which is received with the passcode at the same time (step S127 in FIG. 22).

Then, the browser unit 33 adds the passcode to the service-not-registered screen 610 (step S128 in FIG. 22). As a result, the service-not-registered screen 610 including the passcode is output (projected) using the projector 40.

Figure 25:
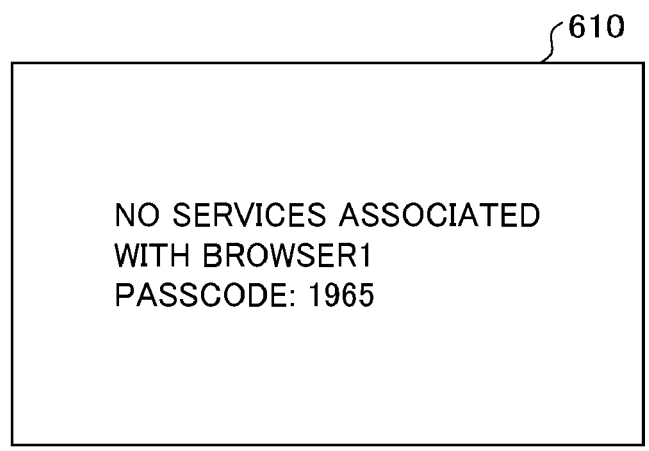
FIG. 25 is an example of output of a service-not-registered screen including a passcode.

FIG. 25 is an example of output of the service-not-registered screen 610 including a passcode. FIG. 25 is an example case of setting the passcode of "1965."

Figure 26B:
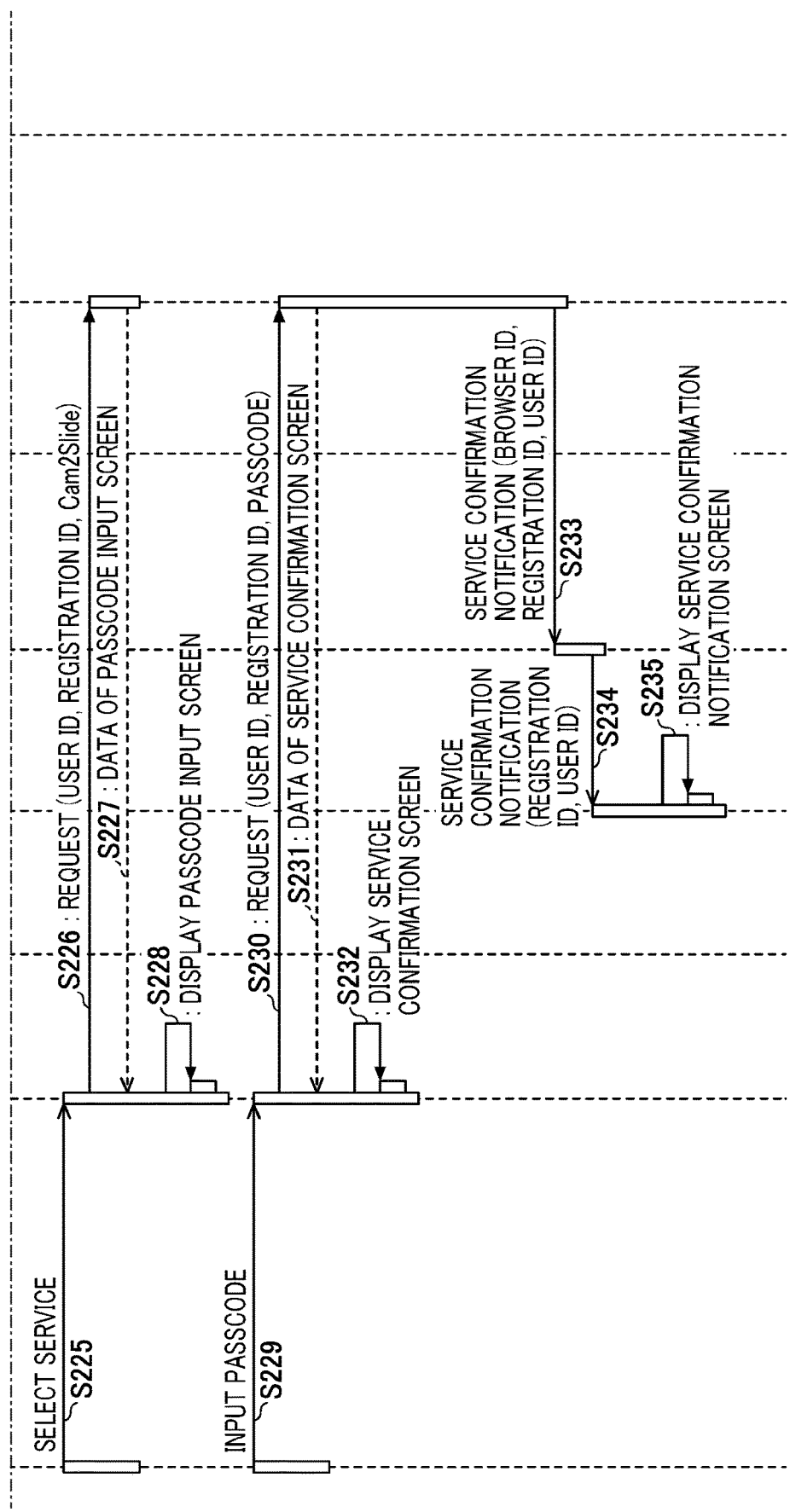

If the passcode is being switched with the pre-set time interval as above described, and then, for example, if the user terminal 20 is placed over the unregistered tag seal attached to the intermediary apparatus 30 identified or specified by the passcode, the sequence of FIGS. 26A and 26B (FIG. 26) is performed.

FIGS. 26A and 26B (FIG. 26) are an example sequence diagram of processing, which is performed when the user terminal 20 is placed closer to an unregistered tag seal. In FIGS. 26A and 26B, the same steps as those in FIG. 11 are denoted by the same step numbers, and the description thereof will be omitted.

When the application determination unit 12 of the server 10B receives the HTTP request (step S205) and then authenticates the account information (authentication succeeds), if a record including the target registration ID included in the HTTP request is not yet stored in the registration information storage unit 124 of the server 10B (i.e., if each ID, such as the browser ID, is not yet stored for the target registration ID in the registration information storage unit 124), the application determination unit 12 of the server 10B transmits, to the browser unit 22 of the user terminal 20, a response (HTTP request) indicating a redirect request including the target registration ID by setting a service information providing application URL as a redirect destination (step S221). The service information providing application URL corresponds to a URL of the service information providing unit 17 (i.e., service information providing application). Further, if the record including the target registration ID is already stored in the registration information storage unit 124 of the server 10 B at step S205, step S206 and subsequent steps are performed as described in FIG. 11.

In accordance with the redirect request received from the application determination unit 12 of the server 10B (step S221), the browser unit 22 of the user terminal 20 transmits (redirects) a HTTP request to the service information providing application URL used as the redirect destination (i.e., an access point of the service information providing unit 17 of the server 10B) (step S222). The HTTP request includes the user ID of the user using the user terminal 20 and the target registration ID.

In response to the receiving the HTTP request from the browser unit 22 of the user terminal 20 (step S222), the service information providing unit 17 of the server 10B generates display data (e.g., HTML and script) of a service menu screen by referring to the service information storage unit 125, and then the service information providing unit 17 transmits a response including the display data to the browser unit 22 of the user terminal 20 (step S223).

Figures 27, 28:
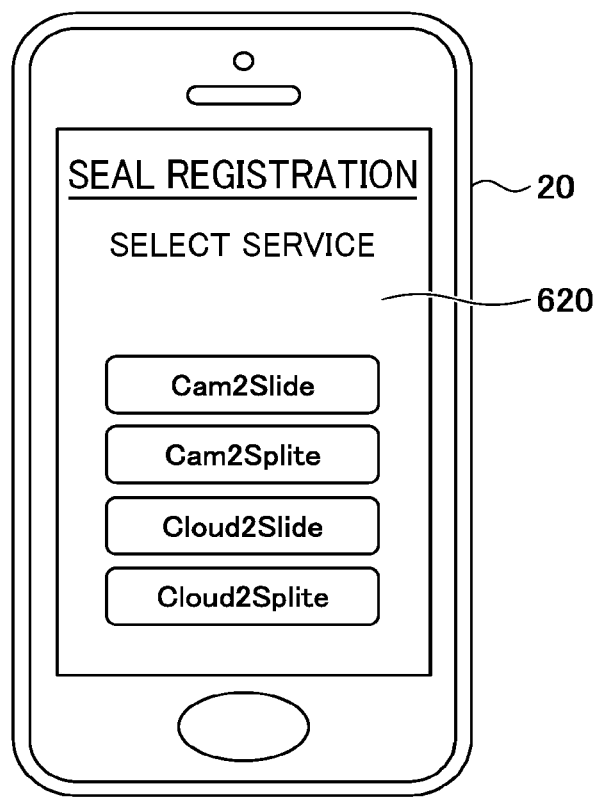
FIG. 27 is an example of information stored in a service information storage unit according to the third embodiment.
FIG. 28 is an example of display of a service menu screen.

FIG. 27 is an example of information stored in the service information storage unit 125. As indicated in FIG. 27, the service information storage unit 125 stores, for example, service ID, In-application ID and Out-application ID in association with each other for each service that can be provided by the server 10B (i.e., for each candidate service to be associated with the registration ID).

The service ID represents identification information identifying a specific service, and a value is set differently for each specific service.

The In-application ID is an application ID of an application used for controlling the input of image data for the specific service. For example, the In-application ID of "AP_Upload" indicates an application ID of the upload application 13 as described above.

The Out-application ID is an application ID of an application used for controlling the output of image data for the specific service. For example, the Out-application ID of "AP_PhotoShow" indicates an application ID of the output application 14 as described above.

The service information providing unit 17 generates the display data of the service menu screen to set each service ID stored in the service information storage unit 125 (i.e., information on candidate service) as the selectable option.

In response to receiving the response from the service information providing unit 17 of the server 10B (step S223), the browser unit 22 of the user terminal 20 generates the service menu screen based on the display data, and displays the generated service menu screen on the display device 211 (step S224).

FIG. 28 is an example of a service menu screen 620. As indicated in FIG. 28, the service menu screen 620 displays, for example, a plurality of service IDs as a selectable service ID list.

If a user selects, on the service menu screen 620, a specific service ID (hereinafter, "target service ID") to be associated with the tag seal (the target registration ID) attached to the intermediary apparatus 30 (step S225), the browser unit 22 of the user terminal 20 transmits, to the distribution unit 11 of the server 10B, an HTTP request including the user ID, the target registration ID and the service selection result (i.e., target service ID) based on the definition of the display data used for generating the service menu screen 620 (step S226).

In response to receiving the HTTP request from the browser unit 22 of the user terminal 20 (step S226), the distribution unit 11 registers, in the registration information storage unit 124, a record (hereinafter, "target tag information record") including the In-application ID and the Out-application ID stored in the service information storage unit 125 (FIG. 27) in association with the target service ID included in the HTTP request, and the target registration ID included in the HTTP request. As a result, the browser ID of the target tag information record still remains as unconfirmed or undetermined information.

In order to determine the browser ID, the distribution unit 11 transmits, to the browser unit 22 of the user terminal 20, a response including display data (e.g., HTML and script) to be used for generating a passcode input screen (step S227).

In response to receiving the response from the distribution unit 11 of the server 10B (step S227), the browser unit 22 generates the passcode input screen based on the display data, and then displays the generated passcode input screen on the display device 211 (step S228).

Figure 29:
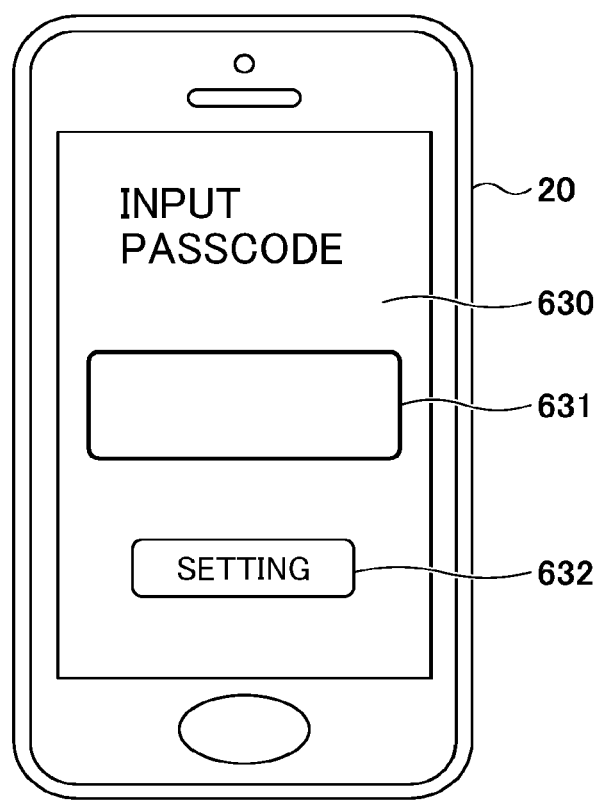
FIG. 29 is an example of display of a passcode input screen.

FIG. 29 is an example of a passcode input screen 630. As indicated in FIG. 29, the passcode input screen 630 displays, for example, a passcode input field 631 and a setting button 632. The passcode input field 631 is a field for receiving an input of passcode, which is being projected by the projector 40 connected to the intermediary apparatus 30 to be associated with the target tag seal. For example, if the service-not-registered screen 610, which is being projected currently by the projector 40, is in the state of FIG. 25, the user of the user terminal 20 inputs "1965" into the passcode input field 631 and then touches the setting button 632 (step S229).

In response to the touching operation to the setting button 632 (step S229), the browser unit 22 of the user terminal 20 transmits, to the distribution unit 11 of the server 10B, an HTTP request including the passcode input into the passcode input field 631 based on the definition of the display data used for generating the passcode input screen 630, and the user ID and the target registration ID (step S230).

Then, the distribution unit 11 searches a specific browser ID, stored in association with the passcode included in the HTTP request, from the apparatus information storage unit 122 (FIG. 24), and then registers the searched specific browser ID to the item of "browser ID" set in the target tag information record. As a result, the content of the target tag information record is determined. That is, the specific projector 40 (the specific intermediary apparatus 30 connected to the specific projector 40) corresponding to the specific service and the specific browser ID, is associated and registered with the target registration ID, which is the target tag seal.

Then, the distribution unit 11 of the server 10B transmits, to the browser unit 22 of the user terminal 20, a response including display data to be used for generating a service confirmation screen indicating the confirmation of the service registration (step S231).

In response to receiving the response from the distribution unit 11 of the server 10B (step S231), the browser unit 22 generates the service confirmation screen based on the display data, and then displays the generated service confirmation screen on the display device 211 (step S232)

Figure 30:
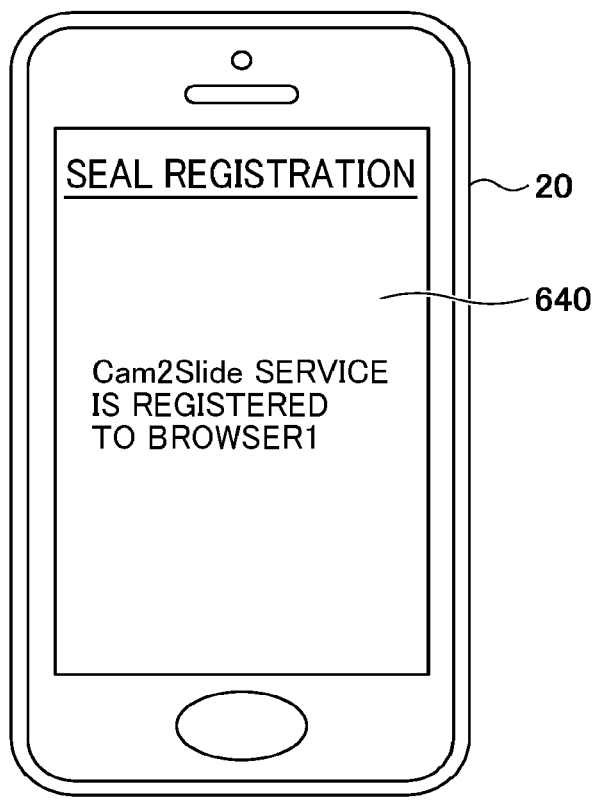
FIG. 30 is an example of display of a service confirmation screen.

FIG. 30 is an example of a service confirmation screen 640. As indicated in FIG. 30, the service confirmation screen 640 displays, for example, a message indicating that the browser ID of the browser unit 33 of the intermediary apparatus 30 associated with the service, and the service ID of the service are associated with each other and registered.

Further, the distribution unit 11 of the server 10B transmits, to the communication control unit 31 of the intermediary apparatus 30, a service confirmation notification including the browser ID of the browser unit 33 of the intermediary apparatus 30 (hereinafter, "target browser ID") associated with the service, the target registration ID, and the user ID (hereinafter, "target user ID") of the user terminal 20 (step S233).

In response to receiving the service confirmation notification from the distribution unit 11 of the server 10B (step S233), the communication control unit 31 transmits, to the browser unit 33 identified or specified by the target browser ID, the service confirmation notification including the target registration ID and the target user ID (step S234).

In response to receiving the service confirmation notification from the communication control unit 31 (step S234), the browser unit 33 inputs the service confirmation notification into the script configuring the display data of the service-not-registered screen 610 (FIG. 25) to switch the rendering content on the pre-set region of the memory 103 (e.g., video memory) from the service-not-registered screen 610 (FIG. 25) to a display screen (hereinafter, service confirmation notification screen) used for the service confirmation notification (step S235). Then, the intermediary apparatus 30 outputs the rendering content (e.g., projection screen) rendered by the browser unit 33 to the projector 40 via an interface, such as HDMI (registered trademark), and then the rendering content is output (projected) using the projector 40.

Figure 31:
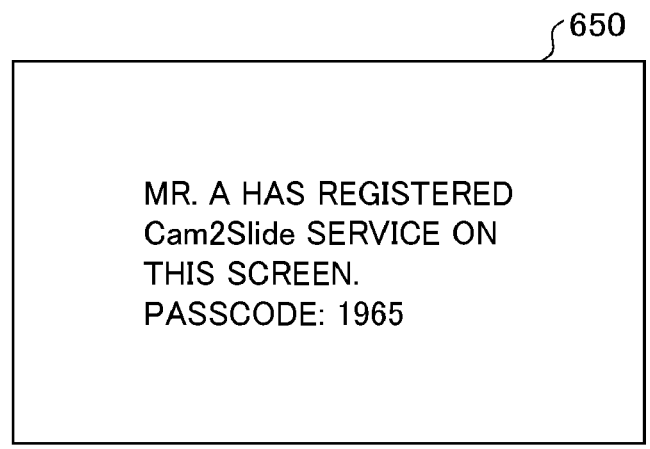
FIG. 31 is an example of output of a service confirmation notification screen.

FIG. 31 is an example of output of a service confirmation notification screen 650. As indicated in FIG. 31, the service confirmation notification screen 650 displays, for example, a message indicating that a user (e.g., Mr. A), identified or specified by the target user ID, has registered the service and the passcode.

Since the service confirmation screen 640 (FIG. 30) is displayed on the user terminal 20 that is placed or set closer to the unregistered tag seal attached to the intermediary apparatus 30, and the service confirmation notification screen 650 (FIG. 31) is output using the projector 40 connected to the intermediary apparatus 30, the user who has performed the operation can confirm that the service using the desired target apparatus, such as the intermediary apparatus 30 and the projector 40, is registered for the unregistered tag seal.

As described above, in the third embodiment, when the user terminal 20 is placed near the unregistered tag seal (set closer to the unregistered tag seal), the user terminal 20 receives the registration ID of the unregistered tag seal. Then the user terminal 20 transmits the registration ID of the unregistered tag seal to the server 10B, and the server 10B receives the registration ID of the unregistered tag seal. If the projector 40 is not registered in association with any one of the services in the server 10B under this situation, the server 10B provides, to the user terminal 20, information on the candidate service to be associated with the projector 40, and then receives a selection result of the service from the user terminal 20. Then, the server 10B identifies or specifies a specific projector 40 based on the information (passcode) used for identifying or specifying the specific projector 40, to be associated with the service related to the service selection result received from the user terminal 20, and then registers the specific projector 40, the service related to the service selection result, and the registration ID in association with each other. Therefore, as to the third embodiment, the association of the apparatus and the service can be implemented by performing a simple operation.

Conventional technology does not disclose how to associate and register services, devices, and workflows.

In the above described one or more embodiments, the association of apparatuses and services can be implemented by performing a simple operation.

Further, each of the server 10, the intermediary apparatus 30, the projector 40, and the user terminals 20 and the message service 50 described as above can be constructed using a single computer, or each unit (function or means) can be divided and then constructed using a plurality of computers arbitrarily assigned with divided units.

The functions of the embodiments described above can be implemented by one or more processing circuits, or circuitry. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

In the above described embodiments, a combination of the intermediary apparatus 30 and the server 10 can be used as one example of the information processing system. The server 10 is an example of the information processing apparatus. The user terminal 20 is an example of the operation terminal. The distribution unit 11 is an example of the registration unit.

The above described embodiments can be configured as follows.

(Configuration 1)

An information processing system includes an intermediary apparatus communicable with a target apparatus, and an information processing apparatus communicable with the intermediary apparatus. The information processing apparatus includes a service information providing unit and a registration unit. When an operation terminal acquires identification information from an external source disposed outside the operation terminal, and the information processing apparatus receives the identification information from the operation terminal and the received identification information is not registered in association with any service in the information processing apparatus, the service information providing unit provides information on a candidate service to be associated with the identification information to the operation terminal. When the information processing apparatus receives a selection result of the candidate service from the operation terminal, the registration unit registers the intermediary apparatus that is identified based on information identifying the intermediary apparatus to be associated with the candidate service selected at the operation terminal, the candidate service corresponding to the selection result, and the identification information in association with each other.

(Configuration 2)

As to the information processing system employing the configuration 1, the information processing apparatus further includes a distribution unit. In response to receiving a given request from the intermediary apparatus that is not registered in association with any service, the distribution unit transmits information identifying the intermediary apparatus to the intermediary apparatus, and then the intermediary apparatus outputs the information identifying the intermediary apparatus, received from the distribution unit, to the target apparatus communicable with the intermediary apparatus.

(Configuration 3)

As to the information processing system employing the configuration 2, when the identification information received by the distribution unit is registered in association with any one of services in the information processing apparatus, the distribution unit transmits an execution request for executing processing related to a specific service associated with the identification information to the intermediary apparatus that is registered in association with the identification information, and then the intermediary apparatus executes processing in accordance with the execution request to control the target apparatus.

(Configuration 4)

As to a method of processing information in an information processing system including an intermediary apparatus communicable with a target apparatus, and an information processing apparatus communicable with the intermediary apparatus, the method includes, when an operation terminal acquires identification information from an external source disposed outside the operation terminal, and the information processing apparatus receives the identification information from the operation terminal and the received identification information is not registered in association with any service in the information processing apparatus, providing information on a candidate service to be associated with the identification information to the operation terminal, and when the information processing apparatus receives a selection result of the candidate service from the operation terminal, registering the intermediary apparatus that is identified based on information identifying the intermediary apparatus to be associated with the candidate service selected at the operation terminal, the candidate service corresponding to the selection result, and the identification information in association with each other.

(Configuration 5)

An information processing apparatus, communicable with a target apparatus and an intermediary apparatus, includes a service information providing unit and a registration unit. When an operation terminal acquires identification information from an external source disposed outside the operation terminal, and the information processing apparatus receives the identification information from the operation terminal and the received identification information is not registered in association with any service in the information processing apparatus, the service information providing unit provides information on a candidate service to be associated with the identification information to the operation terminal. When the information processing apparatus receives a selection result of the candidate service from the operation terminal, the registration unit registers the intermediary apparatus that is identified based on information identifying the intermediary apparatus to be associated with the candidate service selected at the operation terminal, the candidate service corresponding to the selection result, and the identification information in association with each other.

(Configuration 6)

As to a method of processing information using an information processing apparatus communicable with a target apparatus and an intermediary apparatus, the method includes, when an operation terminal acquires identification information from an external source disposed outside the operation terminal, and the information processing apparatus receives the identification information from the operation terminal and the received identification information is not registered in association with any service in the information processing apparatus, providing information on a candidate service to be associated with the identification information to the operation terminal, and when the information processing apparatus receives a selection result of the candidate service from the operation terminal, registering the intermediary apparatus that is identified based on information identifying the intermediary apparatus to be associated with the candidate service selected at the operation terminal, the candidate service corresponding to the selection result, and the identification information in association with each other.

Although the embodiments of the present invention are described in detail above, the present invention is not limited to such a particular embodiment, and within the scope of the present invention described in the claims, various modifications and modifications may be made.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. An information processing system, comprising:
    an intermediary apparatus communicable with a target apparatus; and
    an information processing apparatus including circuitry and a memory, the information processing apparatus communicable with the intermediary apparatus,
    wherein, in response to reception of identification information, including a registration identifier, from an operation terminal that received the identification information from an external source in response to the operation terminal being located within a predetermined distance of the target apparatus, the circuitry is configured to provide, to the operation terminal, information on at least one candidate service that can be performed by the target apparatus, when the received identification information is not registered in association with any service in the information processing apparatus, and
    in response to receiving, at the information processing apparatus from the operation terminal, a selection of a specific service from among the at least one candidate service, made via the operation terminal, the circuitry is configured to register (1) target information identifying the target apparatus to be associated with the selected specific service, (2) the selected specific service, and (3) the registration identifier in association with each other in the memory.

2. The information processing system according to claim 1,
    wherein, in response to receiving a request from the intermediary apparatus communicable with the target apparatus that is not registered in association with any service, the circuitry is further configured to transmit the target information identifying the target apparatus to the intermediary apparatus, and
    wherein the intermediary apparatus outputs the target information identifying the target apparatus received from the information processing apparatus to the target apparatus.

3. The information processing system according to claim 2,
    wherein when the target apparatus is registered in association with a particular service in the information processing apparatus, the circuitry is further configured to transmit an execution request for executing processing related to the particular service associated with the target apparatus to the intermediary apparatus that is registered in association with the target apparatus, wherein the intermediary apparatus executes the processing in accordance with the execution request to control the target apparatus.

4. The information processing system of claim 1, wherein the target apparatus is a projector and the selected specific service is uploading of image data from the operation terminal for output by the projector via the intermediate apparatus.

5. The information processing system of claim 1, wherein the circuitry is further configured to execute a first application associated with the selected specific service to cause the operation terminal to send input data to the circuitry, and execute a second application associated with the selected specific service to cause the intermediate apparatus to download and output the input data.

6. A method of processing information in an information processing system including an intermediary apparatus communicable with a target apparatus, and an information processing apparatus communicable with the intermediary apparatus, the method comprising:
- in response to reception of identification information, including a registration identifier, from an operation terminal that received the identification information from an external source in response to the operation terminal being located within a predetermined distance of the target apparatus, providing, to the operation terminal, information on at least one candidate service that can be performed by the target apparatus, when the received identification information is not registered in association with any service in the information processing apparatus; and
- in response to receiving, at the information processing apparatus from the operation terminal, a selection of a specific service, from among the at least one candidate service, made via the operation terminal, registering (1) target information identifying the target apparatus to be associated with the selected specific service, (2) the selected specific service, and (3) the registration identifier in association with each other.

7. The method according to claim 6, further comprising:
- in response to receiving a request from the intermediary apparatus communicable with the target apparatus that is not registered in association with any service, transmitting the target information identifying the target apparatus to the intermediary apparatus, wherein the intermediary apparatus outputs the target information identifying the target apparatus received from the information processing apparatus to the target apparatus.

8. The method according to claim 7, further comprising:
- when the target apparatus is registered in association with a particular service in the information processing apparatus, transmitting an execution request for executing processing related to the particular service associated with the target apparatus to the intermediary apparatus that is registered in association with the target apparatus, wherein the intermediary apparatus executes the processing in accordance with the execution request to control the target apparatus.

9. The method of claim 6, wherein each of the at least one candidate service relates to processing of image data.

10. An information processing apparatus communicable with a target apparatus and an intermediary apparatus, the information processing apparatus comprising:
- circuitry; and
- a memory,
- wherein, in response to reception of identification information, including a registration identifier, from an operation terminal that received the identification information from an external source in response to the operation terminal being located within a predetermined distance of the target apparatus the circuitry is configured to provide, to the operation terminal, information on at least one candidate service that can be performed by the target apparatus, when the received identification information is not registered in association with any service in the information processing apparatus, and
- in response to receiving, at the information processing apparatus from the operation terminal, a selection of a specific service, from among the at least one candidate service, made via the operation terminal, the circuitry is configured to register (1) target information identifying the target apparatus to be associated with the selected specific service, (2) the selected specific service, and (3) the registration identifier in association with each other in the memory.

* * * * *